US012576637B2

(12) United States Patent
Kodoi

(10) Patent No.: US 12,576,637 B2
(45) Date of Patent: Mar. 17, 2026

(54) LIQUID EJECTION HEAD AND LIQUID EJECTION APPARATUS

(71) Applicant: CANON KABUSHIKI KAISHA, Tokyo (JP)

(72) Inventor: Takuma Kodoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/397,228

(22) Filed: Dec. 27, 2023

(65) Prior Publication Data

US 2024/0217234 A1 Jul. 4, 2024

(30) Foreign Application Priority Data

Dec. 28, 2022 (JP) ................................ 2022-211411

(51) Int. Cl.

*B41J 2/14* (2006.01)
*B41J 2/155* (2006.01)
*B41J 2/16* (2006.01)
*B41J 2/165* (2006.01)
*B41J 2/175* (2006.01)

(52) U.S. Cl.

CPC ....... *B41J 2/14024* (2013.01); *B41J 2/14233* (2013.01); *B41J 2/1433* (2013.01); *B41J 2/155* (2013.01); *B41J 2/161* (2013.01); *B41J 2/165* (2013.01); *B41J 2/17536* (2013.01); *B41J 2002/14475* (2013.01); *B41J 2202/17* (2013.01)

(58) Field of Classification Search

CPC . B41J 2/135; B41J 2/14; B41J 2/14016; B41J 2/14024; B41J 2/14201; B41J 2/14233; B41J 2/1433; B41J 2/145; B41J 2/155; B41J 2/16; B41J 2/1607; B41J 2/161; B41J 2/165; B41J 2202/01; B41J 2202/17

See application file for complete search history.

(56) References Cited

U.S. PATENT DOCUMENTS

2008/0062218 A1* 3/2008 Yanagisawa ........... B41J 29/393 347/19
2010/0149264 A1* 6/2010 Takimoto ............. B41J 2/14233 347/47
2022/0288927 A1* 9/2022 Numajiri .............. B41J 2/16502

FOREIGN PATENT DOCUMENTS

JP 3108771 B2 11/2000

* cited by examiner

*Primary Examiner* — Douglas X Rodriguez
*Assistant Examiner* — Kendrick X Liu
(74) *Attorney, Agent, or Firm* — Venable LLP

(57) ABSTRACT

A liquid ejection head includes a print element substrate having an ejection surface on which a plurality of ejection ports corresponding to print elements for ejecting liquid are formed and a plurality of ejection port arrays formed of a plurality of the ejection ports are formed and a protective member having a plurality of openings and placed on the print element substrate so that the plurality of openings and the plurality of ejection port arrays are aligned so as to correspond to each other, and one or more print element number identifiers for identifying one or more print element numbers assigned to the print elements are at one or more locations above the ejection port arrays and near at least one of the plurality of openings on the protective member.

15 Claims, 17 Drawing Sheets

LIQUID EJECTION HEAD AND LIQUID EJECTION APPARATUS

BACKGROUND OF THE INVENTION

Field of the Invention

The present disclosure relates to a liquid ejection head and a liquid ejection apparatus.

Description of the Related Art

In recent years, high-speed printing has been required from inkjet printing apparatuses used for commercial uses such as an office, a retail store, and industrial uses. In order to achieve high-speed printing, a line head in which a plurality of print element substrates are arrayed and which is compatible with the width of a print medium is used to continuously or intermittently convey a plurality of print media and perform continuous printing in one pass. At that time, there may arise a problem that a print medium being conveyed floats thereby coming into contact with a print element substrate and damaging a liquid ejection head. As a method for solving the above problem, Japanese Patent No. 3108771 (hereinafter referred to as Literature 1) discloses that a protective member made of resin or metal is adhered to an ejection port forming surface.

SUMMARY OF THE INVENTION

However, there is a possibility that in the configuration in which a metal protective member having an opening for each ejection port is adhered to an ejection surface as disclosed in Literature 1, a nozzle number inscribed on the print element substrate may be hidden due to misalignment of the opening. Further, in a case where an adhesive is used for adhesion and covers an opening portion for identifying the nozzle number, there is also a possibility that the nozzle number may be invisible due to the high refractive index of the adhesive.

In view of the above problems, the present disclosure provides a liquid ejection head in which a print element number can be reliably checked and reliability can be maintained even in the case of using a protective member added to reduce the risk of damage to the liquid ejection head due to contact with a print medium.

According to an aspect of the present invention, a liquid ejection head includes a print element substrate having an ejection surface on which ejection ports corresponding to print elements for ejecting liquid are formed and a plurality of ejection port arrays formed of a plurality of the ejection ports are formed; and a protective member having a plurality of openings and placed on the print element substrate so that the plurality of openings and the plurality of ejection port arrays are aligned so as to correspond to each other, wherein one or more print element number identifiers for identifying one or more print element numbers assigned to the print elements are at a one or more locations above the ejection port arrays and near at least one of the plurality of openings on the protective member.

Further features of the present invention will become apparent from the following description of exemplary embodiments with reference to the attached drawings.

DESCRIPTION OF THE EMBODIMENTS

A description will be given of an example of embodiments of the present disclosure with reference to the drawings. However, the following description does not limit the scope of the present disclosure. In the present embodiment, a thermal method in which liquid is ejected by generating air bubbles using a heating element is adopted as an example, but the present disclosure is also applicable to liquid ejection heads adopting a piezoelectric method and various other liquid ejection methods.

In the present embodiment, an inkjet printing apparatus (printing apparatus) is in a form in which liquid such as ink is circulated between a tank and a liquid ejection head, but may be in another form. For example, the printing apparatus may be in a form in which instead of circulating ink, two tanks are provided on the upstream side and downstream side of the liquid ejection head and flowing ink from one tank to the other tank causes ink in a pressure chamber to flow.

Further, although the present embodiment uses a so-called line head having a length corresponding to the width of a print medium, the present disclosure may also be applied to a so-called serial liquid ejection head that performs printing while scanning a print medium. Examples of the serial liquid ejection head include one in which one print element substrate for a black ink and one print element substrate for a color ink are mounted. However, the present disclosure is not limited to this and may use a serial liquid ejection head in a form in which a short line head which is shorter than the width of a print medium and in which several print element substrates are arranged in an ejection port array direction so that ejection ports overlap is created and is then caused to scan the print medium.

Description of the Basic Configuration of the Present Disclosure

Description of an Inkjet Printing Apparatus

Figure 1:
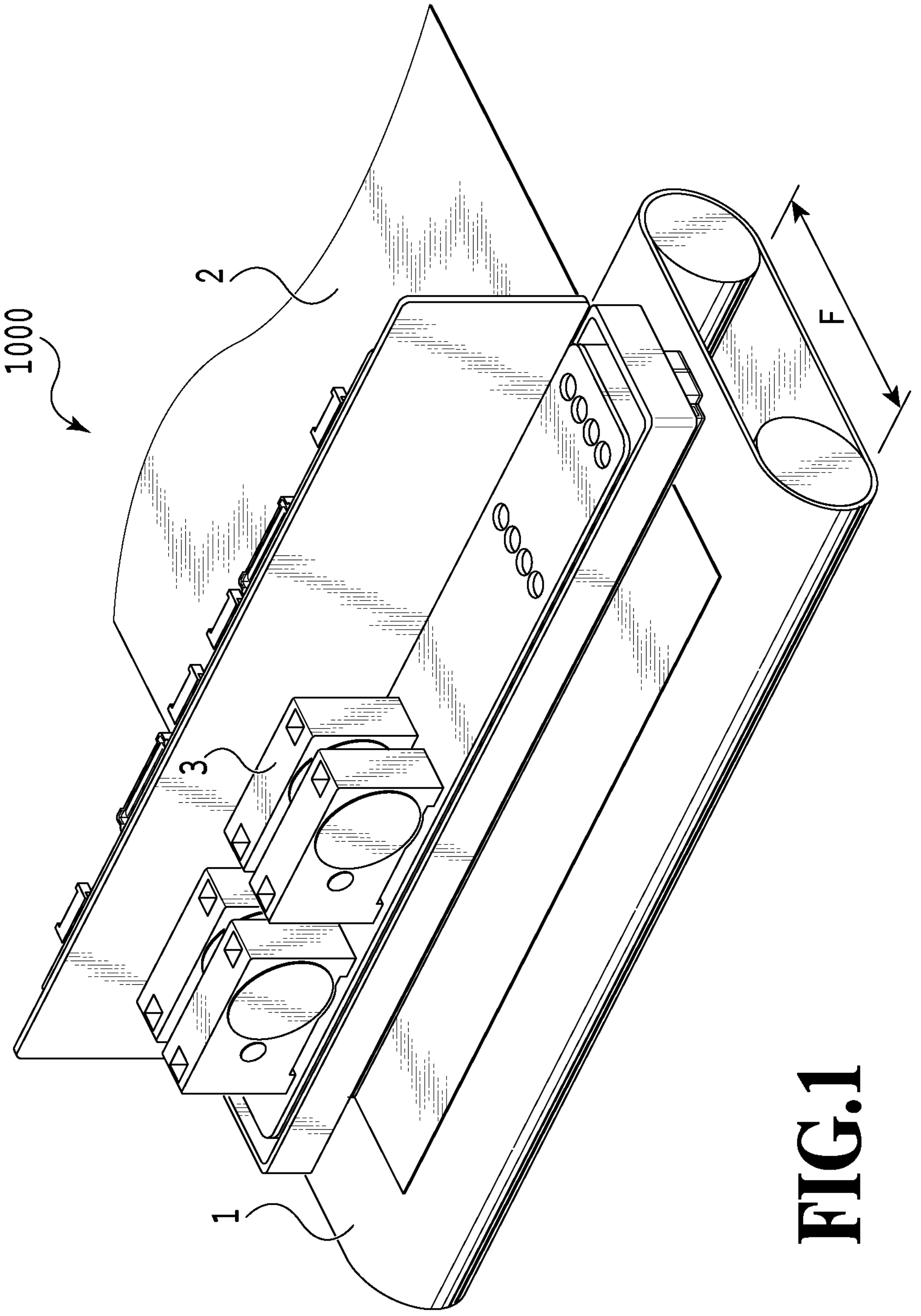
FIG. 1 is a schematic configuration diagram of an inkjet printing apparatus.

FIG. 1 shows a schematic configuration of an inkjet printing apparatus 1000 (hereinafter also referred to as printing apparatus) that ejects ink to perform printing according to the present disclosure, the inkjet printing apparatus 1000 being an example of a liquid ejection apparatus that ejects liquid. The printing apparatus 1000 includes a conveyance unit 1 that conveys a print medium 2 and a line liquid ejection head 3 arranged substantially orthogonal to a print medium conveyance direction, and is a line printing apparatus that performs continuous printing in one pass while continuously or intermittently conveying a plurality of the print media 2. The print medium 2 is not limited to cut paper but may be continuous roll paper.

The liquid ejection head 3 is capable of full-color printing using CMYK inks (cyan, magenta, yellow, and black) and is fluidly connected to a liquid supply means which is a supply path for supplying liquid to the liquid ejection head (as described later), a main tank, and a buffer tank (see FIG. 2). The liquid ejection head 3 is also electrically connected to an electric control unit that communicates electric power and an ejection control signal to the liquid ejection head 3. A liquid path and an electrical signal path in the liquid ejection head 3 will be described later.

Description of a Circulation Path

Figure 2:
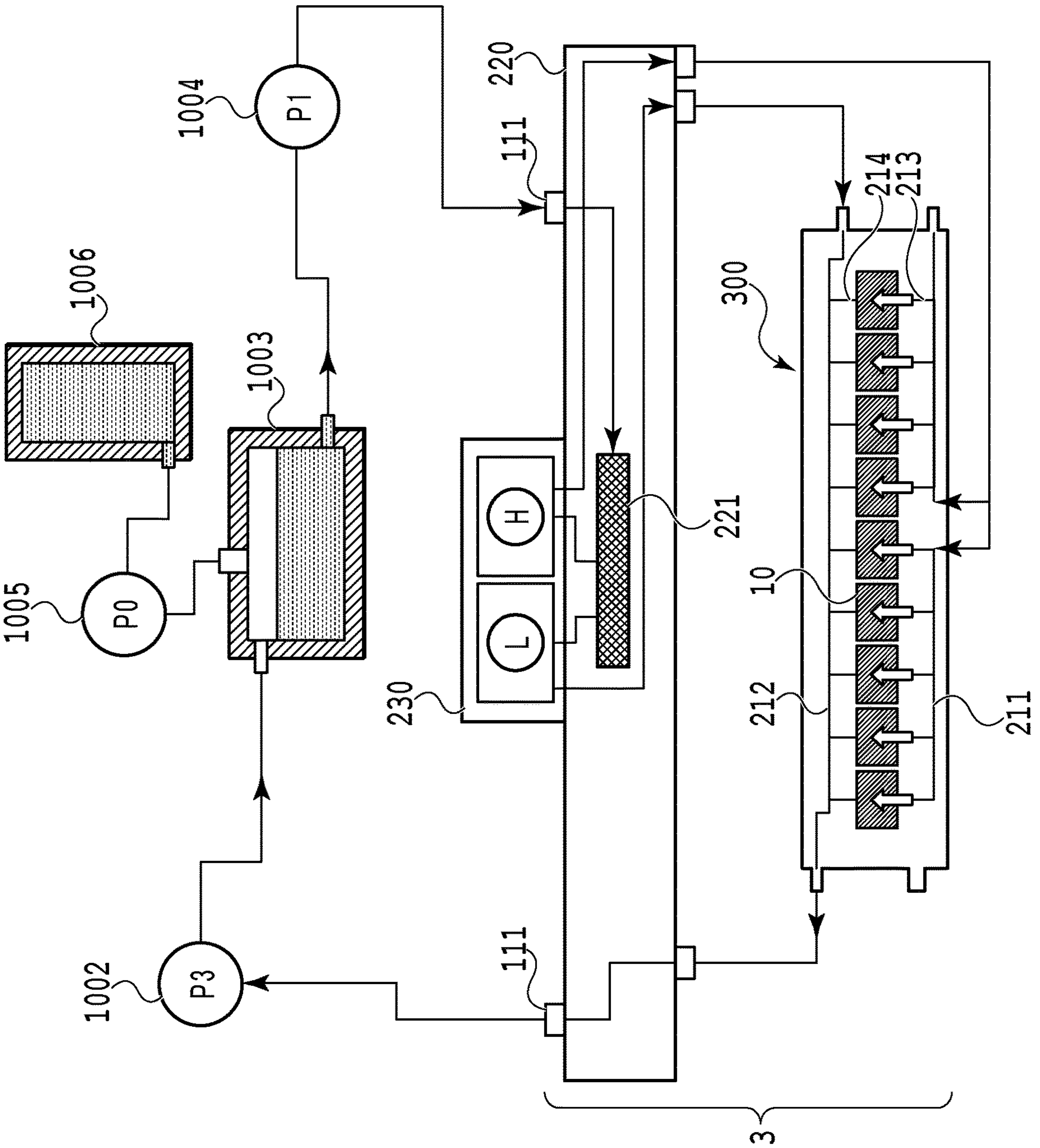
FIG. 2 is a schematic diagram of a liquid circulation path.

FIG. 2 is a schematic diagram showing a circulation path applied to the printing apparatus according to the present embodiment and a diagram in which the liquid ejection head 3 is fluidly connected to a first circulation pump 1002, a buffer tank 1003, and the like. It should be noted that FIG. 2 only shows a path through which ink of one color of the CMYK inks flows to simplify description. A buffer tank 1003 as a sub tank connected to a main tank 1006 has an air communication port (not shown) that establishes communication between the inside and outside of the tank and can discharge an air bubble in ink to the outside. The buffer tank 1003 is also connected to a replenishing pump 1005. In a case where liquid is consumed in the liquid ejection head 3 by ejecting (discharging) ink from an ejection port of the liquid ejection head, such as printing by ejecting ink or suction recovery, the replenishing pump 1005 transfers ink by the amount of consumption from the main tank 1006 to the buffer tank 1003.

The first circulation pump 1002 has the role of drawing out liquid from a liquid connection unit 111 of the liquid ejection head 3 to flow the liquid to the buffer tank 1003. The first circulation pump is preferably a displacement pump having the capability of quantitatively feeding liquid. Specific examples include a tube pump, gear pump, diaphragm pump, syringe pump, and the like, but a form may also be used in which, for example, a general constant flow valve or relief valve is arranged at a pump outlet to secure a constant flow rate. At the time of driving the liquid ejection head 3, a certain amount of ink flows through a common collection flow path 212 by the first circulation pump 1002. This flow rate is preferably set to a level or higher such that the temperature difference between print element substrates 10 in the liquid ejection head 3 does not affect print image quality.

However, in a case where too high a flow rate is set, the negative pressure difference becomes too large between the print element substrates 10 due to the influence of pressure drop in a flow path within the liquid ejection unit 300, and uneven density occurs in an image. Thus, it is preferable to set a flow rate in consideration of the temperature difference and negative pressure difference between the print element substrates 10.

A negative pressure control unit 230 is provided between a path between a second circulation pump 1004 and the liquid ejection unit 300 and has the function of operating to maintain a pressure on a downstream side of the negative pressure control unit 230 (that is, on the liquid ejection unit 300 side) at a preset constant pressure even in a case where the flow rate of a circulation system fluctuates with the difference in duty during printing. Two pressure adjustment mechanisms that form the negative pressure control unit 230 may be any mechanism as long as it can control the pressure in a portion downstream of the mechanism itself within a certain range of fluctuations around a desired set pressure.

As an example, a mechanism similar to a so-called "pressure-reducing regulator" can be employed. In the case of using the pressure-reducing regulator, as shown in FIG. 2, it is preferable that the second circulation pump 1004 pressurize the upstream side of the negative pressure control unit 230 via the liquid supply unit 220. This can suppress the influence of a water head pressure of the buffer tank 1003 on the liquid ejection head 3, so that the degree of freedom in the layout of the buffer tank 1003 in the printing apparatus 1000 can be increased. It is only required that the second circulation pump 1004 have a pump head pressure of a certain pressure or more within the range of an ink circulation flow rate used at the time of driving the liquid ejection head 3, and a turbo pump, a displacement pump, or the like can be used as the second circulation pump 1004. Specifically, a diaphragm pump or the like can be applied. Further, instead of the second circulation pump 1004, for example, a water head tank arranged with a certain water head difference relative to the negative pressure control unit 230 may also be applied.

As shown in FIG. 2, the negative pressure control unit 230 includes the two pressure adjustment mechanisms set at different control pressures. One set at a relatively high pressure (denoted as H in FIG. 2) and the other at a relatively low pressure (denoted as L in FIG. 2) of the two negative pressure adjustment mechanisms are connected through the liquid supply unit 220 to a common supply flow path 211 and a common collection flow path 212 in the liquid ejection unit 300, respectively.

The liquid ejection unit 300 is provided with the common supply flow path 211, the common collection flow path 212, and an individual supply flow path 213 and an individual collection flow path 214 that communicate with the print element substrate. Since the individual supply flow path 213 and the individual collection flow path 214 communicate with the common supply flow path 211 and the common collection flow path 212, respectively, a portion of liquid flowed with the first circulation pump 1002 passes from the common supply flow path 211 through an internal flow path in the print element substrate 10 and flows into the common collection flow path 212 (arrows in FIG. 2). This is because a pressure difference is provided between the pressure adjustment mechanism H connected to the common supply flow path 211 and the pressure adjustment mechanism L connected to the common collection flow path 212 and the first circulation pump 1002 is connected only to the common collection flow path 212.

In this way, in the liquid ejection unit 300, there are produced a flow of liquid through the common collection flow path 212 and a flow from the common supply flow path 211 through the internal flow path in each print element substrate 10 to the common collection flow path 212. This makes it possible to discharge heat generated in each print element substrate 10 to the outside of the print element substrate 10 with the flow from the common supply flow path 211 to the common collection flow path 212 while suppressing an increase in pressure loss. Such a configuration makes it possible to cause a flow of ink even in the ejection port or pressure chamber where no printing is being performed while printing is performed using the liquid ejection head 3, so that the thickening of ink in that site can be suppressed. It is also possible to discharge thickened ink and foreign matter in ink to the common collection flow path 212. This makes it possible for the liquid ejection head 3 according to the present embodiment to perform high-speed and high-quality printing.

Description of the Liquid Ejection Head

Figure 3A:
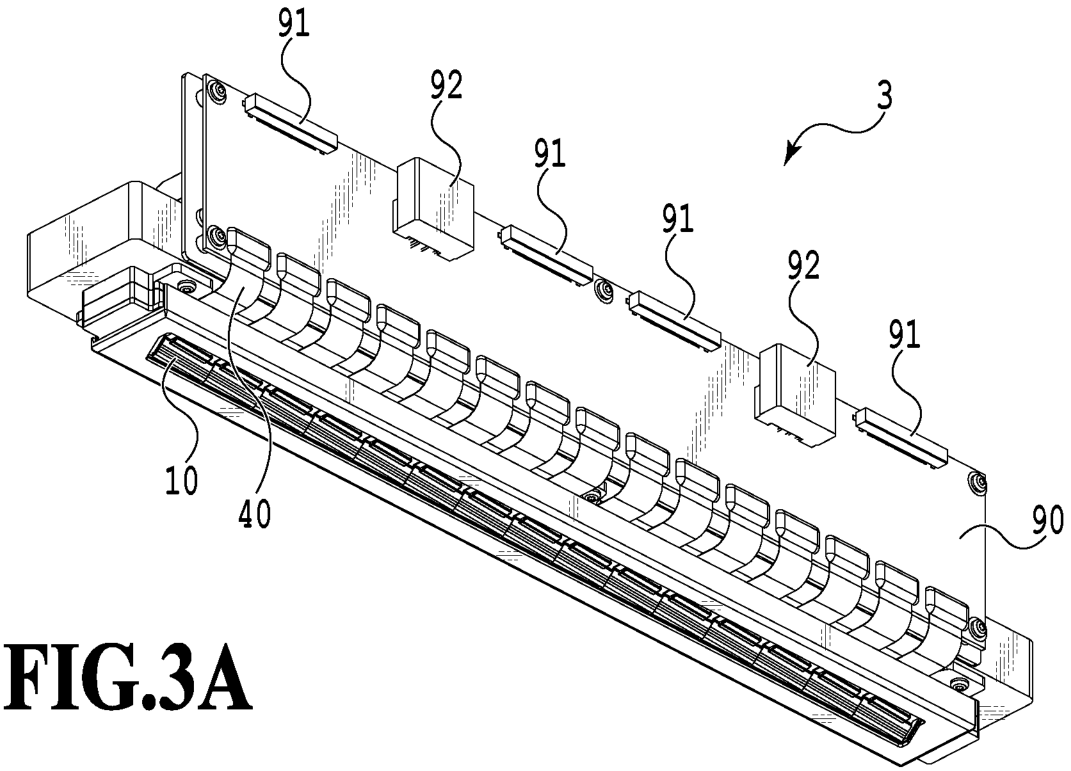
FIGS. 3A and 3B are perspective views of a liquid ejection head.
Figure 3B:
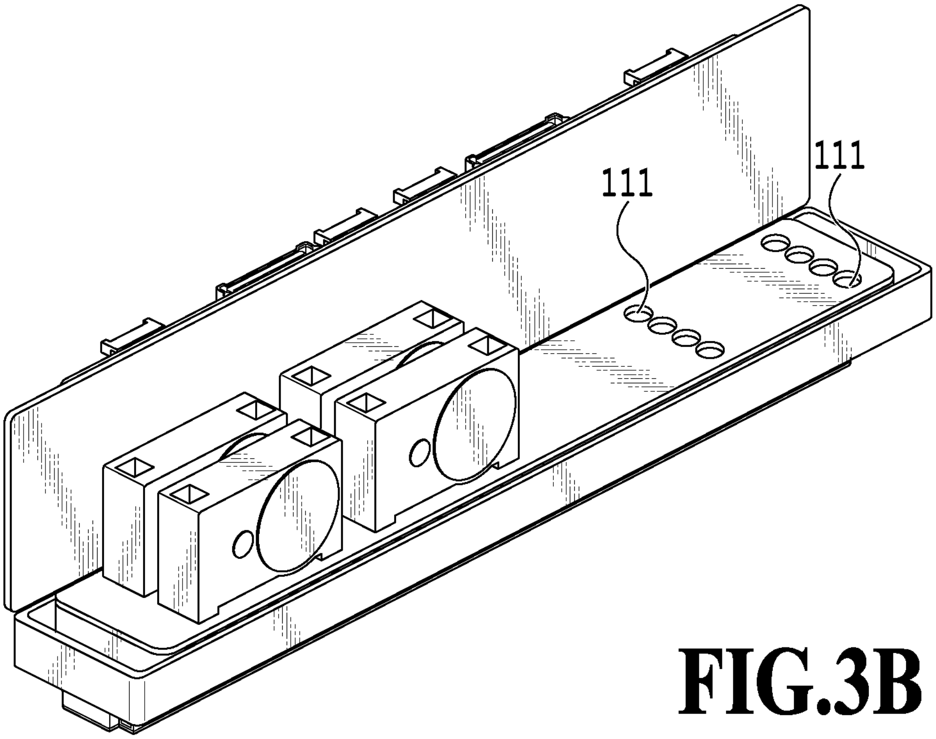

A configuration of the liquid ejection head 3 according to the present embodiment will be described. FIGS. 3A and 3B are perspective views of the liquid ejection head 3 according to the present embodiment. The liquid ejection head 3 is a line liquid ejection head in which 15 print element substrates 10, each of which can eject inks of a plurality of colors, are arrayed on a straight line (arranged in-line).

As shown in FIG. 3A, the liquid ejection head 3 includes each print element substrate 10 and a signal input terminal 91 and power supply terminal 92 electrically connected via a flexible wiring substrate 40 and an electric wiring substrate 90. The signal input terminal 91 and the power supply terminal 92 are electrically connected to a control unit of the printing apparatus 1000 and supply the printing element substrate 10 with an ejection drive signal and power necessary for ejection, respectively. Integrating wiring using an electric circuit in the electric wiring substrate 90 makes it possible to reduce the number of signal input terminals 91 and the number of power supply terminals 92 as compared to the number of print element substrates 10. This reduces the number of electrical connection portions that need to be removed at the time of assembling the liquid ejection head 3 to the print apparatus 1000 or replacing the liquid ejection head.

As shown in FIG. 3B, the liquid connection unit 111 provided on one side of the liquid ejection head 3 is connected to a liquid supply system of the printing apparatus 1000. As a result, ink is supplied from the supply system of the printing apparatus 1000 to the liquid ejection head 3, and the ink that has passed through the liquid ejection head 3 is collected into the supply system of the printing apparatus 1000. Ink of each color can be thus circulated through a path in the printing apparatus 1000 and a path in the liquid ejection head 3.

Figure 4:
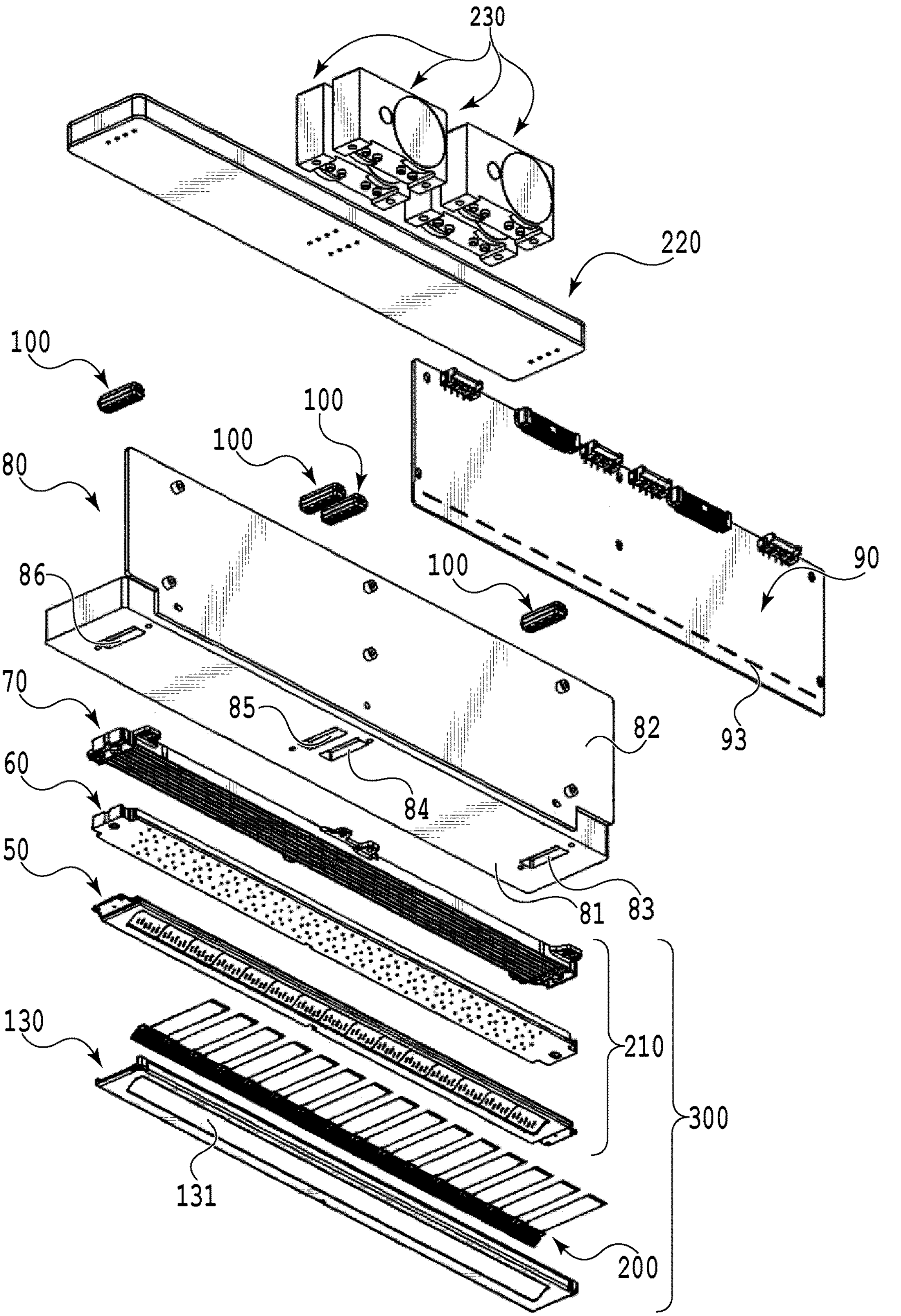
FIG. 4 is an exploded perspective view of the liquid ejection head.

FIG. 4 shows an exploded perspective view of each component or unit that forms the liquid ejection head 3. The liquid ejection unit 300, liquid supply unit 220, and electric wiring substrate 90 are attached to a housing 80. The liquid supply unit 220 is provided with a liquid connection unit 111 (FIGS. 3A and 3B), and the inside of the liquid supply unit 220 is provided with a filter 221 (FIG. 2) for each color that communicates with an opening of the liquid connection unit 111 in order to remove foreign matter from ink supplied. The liquid supply unit 220 is provided with the filters 221 for four colors. The liquid that has passed through the filter 221 is supplied to the negative pressure control unit 230 arranged on the liquid supply unit 220 corresponding to each color.

The negative pressure control unit 230 is a unit including a pressure adjustment valve for each color and, by the action of a valve, spring member, or the like provided inside, can significantly attenuate a change in pressure drop in the supply system (the supply system on the upstream side of the liquid ejection head 3) of the printing apparatus 1000 caused by fluctuations in the liquid flow rate and stabilize a negative pressure change on the downstream side of the pressure control unit (liquid ejection unit 300 side) within a certain range. As described in FIG. 2, the negative pressure control unit 230 for each color includes two built-in pressure adjustment valves for each color set at different control pressures, and one at a high pressure communicates with the common supply flow path 211 in the liquid ejection unit 300 and the other one at a low pressure communicates with the common collection flow path 212 via the liquid supply unit 220.

The housing 80 includes a liquid ejection unit support unit 81 and an electric wiring substrate support unit 82, supports the liquid ejection unit 300 and the electric wiring substrate 90, and secures the rigidity of the liquid ejection head 3.

The electric wiring substrate support unit 82 is for supporting the electric wiring substrate 90 and is fixed to the liquid ejection unit support unit 81 by screwing. The liquid ejection unit support unit 81 has the role of correcting warpage and deformation of the liquid ejection unit 300 and securing the accuracy of relative positions of the plurality of print element substrates 10, thereby suppressing streaks and unevenness in a printed subject. Thus, the liquid ejection unit support unit 81 preferably has sufficient rigidity, and material for the liquid ejection unit support unit 81 is suitably metal material such as SUS or aluminum, or ceramic such as alumina. The liquid ejection unit support unit 81 is provided with openings 83, 84, 85, and 86 into which a joint rubber 100 is inserted. Liquid supplied from the liquid supply unit 220 is guided via the joint rubber to the flow path member 210 that forms the liquid ejection unit 300.

The liquid ejection unit 300 includes a plurality of ejection modules 200 and the flow path member 210, and a cover member 130 is attached to the surface on a print medium side of the liquid ejection unit 300. Here, as shown in FIG. 4, the cover member 130 is a member having a frame-shaped surface provided with a long opening 131, and the print element substrate 10 and a sealing unit 110 (FIGS. 8A and 8B) included in the ejection module 200 are exposed from the opening 131. A frame portion around the opening 131 functions as an abutting surface of a cap member that caps the liquid ejection head 3 during a print standby period. Thus, it is preferable that closed space be formed during capping by applying an adhesive, sealing material, filler, or the like along the periphery of the opening 131 to fill an uneven portion and a gap on the ejection port surface of the liquid ejection unit 300.

Next, a configuration of the flow path member 210 included in the liquid ejection unit 300 will be described. As shown in FIG. 4, the flow path member 210 is a laminate of a first flow path member 50, a second flow path member 60, and a third flow path member 70, and is a flow path member for distributing liquid supplied from the liquid supply unit 220 to each ejection module 200 and for returning the liquid refluxed from the ejection module 200 to the liquid supply unit 220. The flow path member 210 is fixed to the liquid ejection unit support unit 81 by screwing, thereby suppressing warpage and deformation of the flow path member 210.

Figure 5A:
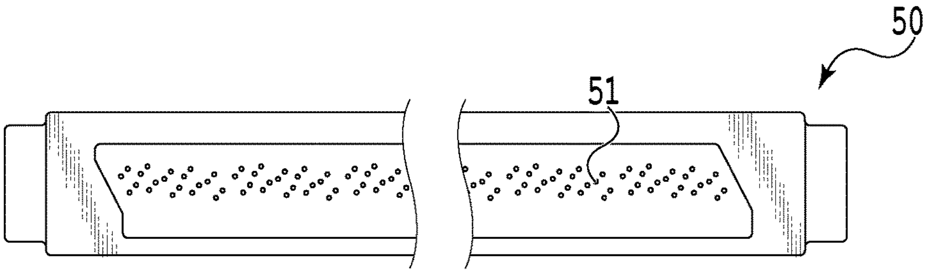
FIGS. 5A to 5F are diagrams showing a surface of a first flow path member on which an ejection module is mounted and abutting surfaces of the first flow path member and second to fourth flow path members.
Figure 5B:
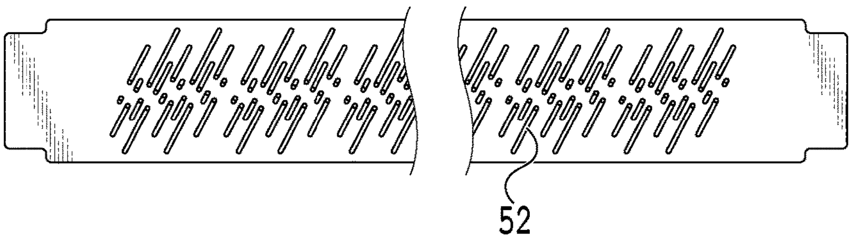
Figure 5C:
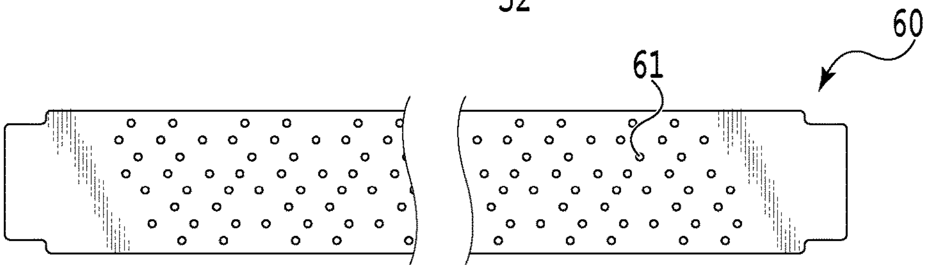
Figure 5D:
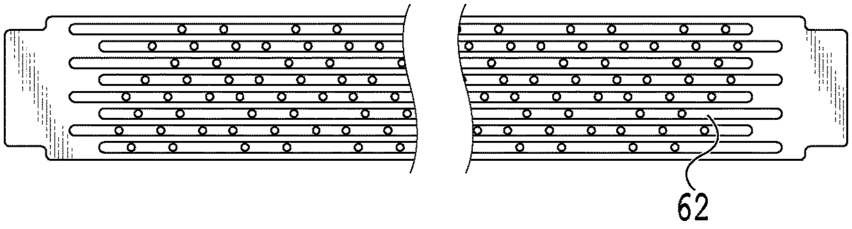
Figure 5E:
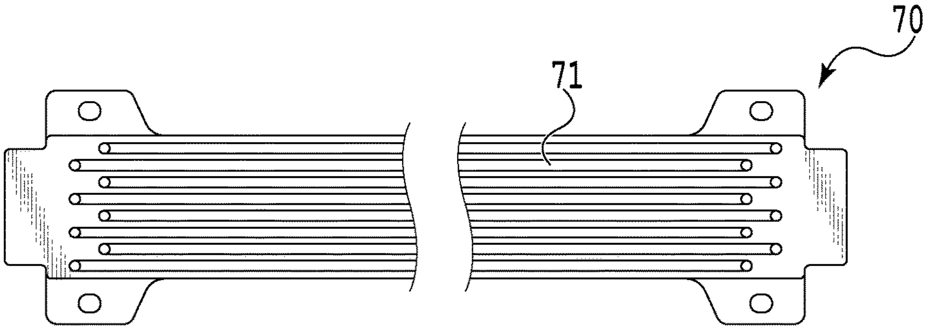
Figure 5F:
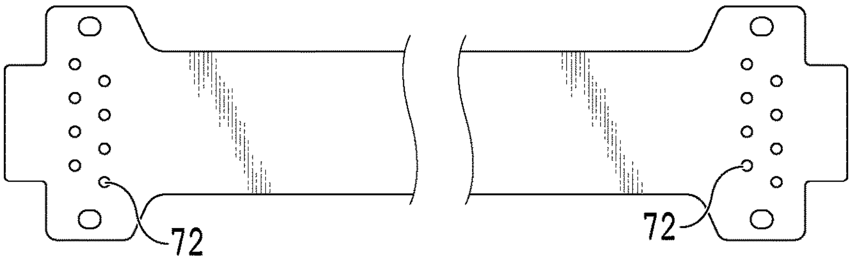

FIGS. 5A to 5F are diagrams showing the front and back surfaces of each of the first to third flow path members. FIG. 5A shows a surface of the first flow path member 50 on which the ejection module 200 is mounted, and FIG. 5F shows a surface of the third flow path member 70 abutting the liquid ejection unit support unit 81.

The first flow path member 50 and the second flow path member 60 are bonded to each other so that the abutting surfaces of the flow path members shown in FIGS. 5B and 5C face each other, and the second flow path member 60 and the third flow path member 70 are bonded to each other so that the abutting surfaces of the flow path members shown in FIGS. 5D and 5E face each other.

Figure 6:
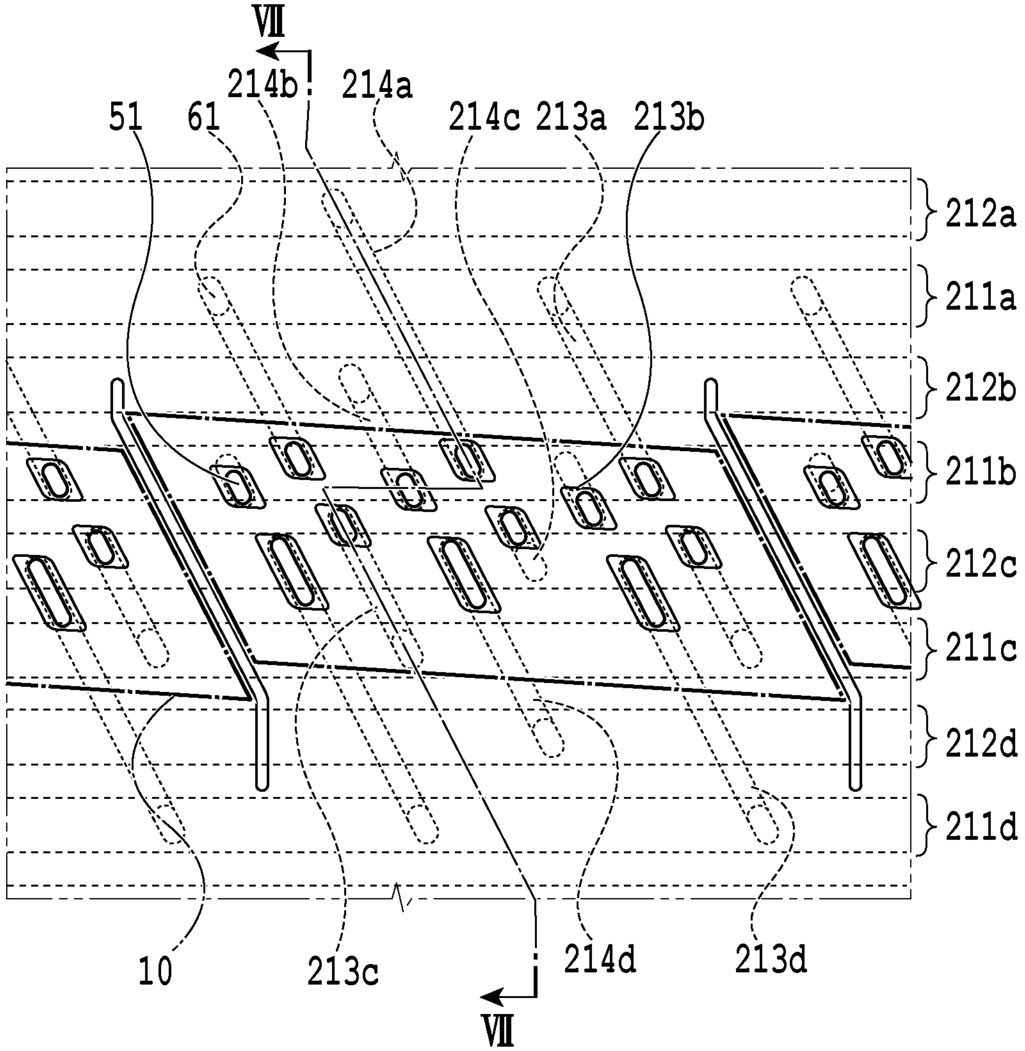
FIG. 6 is a partially enlarged perspective view of a flow path in a flow path member from the surface side on which the ejection module is mounted.

By bonding the second flow path member 60 and the third flow path member 70, eight common flow paths extending in the longitudinal direction of the flow path members are formed by common flow path grooves 62 and 71 formed in the respective flow path members. As a result, a set of the common supply flow path 211 and common collection flow path 212 is formed for each color in the flow path member 210 (FIG. 6).

A communication port 72 of the third flow path member 70 communicates with a hole of the joint rubber 100 and is in fluid communication with the liquid supply unit 220. A plurality of communication ports 61 are formed on the bottom surface of the common flow path groove 62 of the second flow path member 60 and communicate with one end of an individual flow path groove 52 of the first flow path member 50. The other end of the individual flow path groove 52 of the first flow path member 50 has a communication port 51 and is in fluid communication with the plurality of ejection modules 200 via the communication port 51. The individual flow path groove 52 makes it possible to integrate the flow paths at the center of the flow path members.

It is preferable that the first to third flow path members be made of material that is corrosion resistant to liquid and has a low linear expansion coefficient. As the material, for example, it is possible to suitably use composite material (resin material) made by adding an inorganic filler such as a silica particle or a fiber to alumina, a liquid crystal polymer (LCP), polyphenylsulfide (PPS), polysulfone (PSF), and modified polyphenylene ether (PPE) used as base material. The flow path member 210 may be formed by laminating three flow path members and adhering them to each other or may be formed using a bonding method by welding in a case where composite resin material is selected as the material.

Next, the connection relationship between flow paths in the flow path member 210 will be described with reference to FIG. 6. FIG. 6 is an enlarged perspective view of a portion of a flow path in the flow path member 210 formed by bonding the first to third flow path members as viewed from the surface of the first flow path member 50 on which the ejection module 200 is mounted.

The flow path member 210 is provided with the common supply flow path 211 (211*a*, 211*b*, 211*c*, 211*d*) and common collection flow path 212 (212*a*, 212*b*, 212*c*, 212*d*) extending in the longitudinal direction of the liquid ejection head 3 for each color. A plurality of individual supply flow paths (213*a*, 213*b*, 213*c*, 213*d*) formed by the individual flow path grooves 52 are connected to the common supply flow path 211 for each color via the communication port 61. Further, a plurality of individual collection flow paths (214*a*, 214*b*, 214*c*, 214*d*) formed by the individual flow path grooves 52 are connected to the common collection flow path 212 for each color via the communication port 61.

Such a flow path configuration makes it possible to integrate ink from each common supply flow path 211 to the print element substrate 10 located at the center of the flow path member via the individual supply flow path 213. Further, ink can be collected from the print element substrate 10 into each common collection flow path 212 via the individual collection flow path 214.

Figure 7:
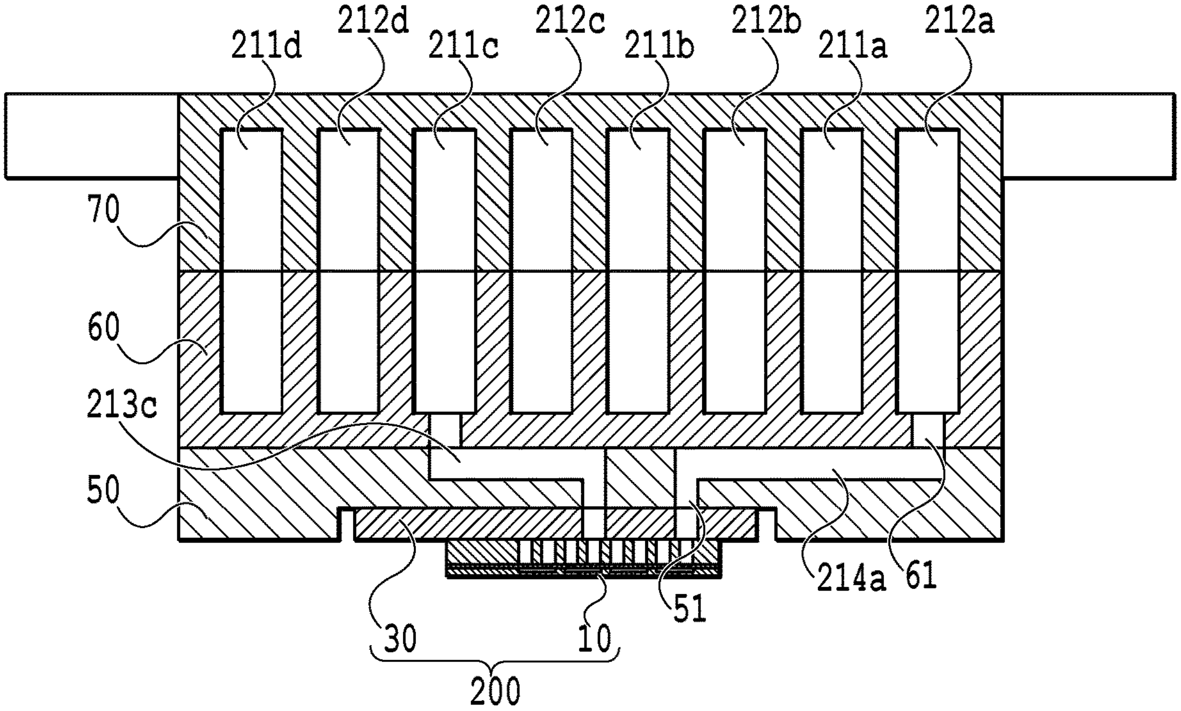
FIG. 7 is a cross-sectional view taken along line VII-VII in FIG. 6.

FIG. 7 is a diagram showing a cross section taken along line VII-VII in FIG. 6. As shown in this figure, the individual supply flow path 213*c* and the individual collection flow path 214*a* communicate with the ejection module 200 via the communication port 51. FIG. 7 illustrates only the individual supply flow path 213*c* and the individual collection flow path 214*a*. However, in another cross section, as shown in FIG. 6, the other individual supply flow paths (213*a*, 213*b*, 213*d*) and the other individual collection flow paths (214*b*, 214*c*, 214*d*) communicate with the ejection module 200.

The support member 30 and the print element substrate 10 included in each ejection module 200 include a flow path formed for supplying ink from the first flow path member 50 to a print element 15 (FIGS. 9A to 9C) provided on the print element substrate 10 and a flow path formed for collecting (circulating) a portion or all of the liquid supplied to the print element 15 into the first flow path member 50.

Here, the common supply flow path 211 for each color is connected to the negative pressure control unit 230 (at high pressure) for a corresponding color via the liquid supply unit 220, and the common collection flow path 212 is connected to the negative pressure control unit 230 (at low pressure) via the liquid supply unit 220. This negative pressure control unit 230 is configured to generate a differential pressure (pressure difference) between the common supply flow path 211 and the common collection flow path 212. Thus, in the liquid ejection head according to the present embodiment in which each flow path is connected as shown in FIGS. 6 and 7, a flow is produced for each color which flows in the order of the common supply flow path 211, the individual supply flow path 213, the print element substrate 10, the individual collection flow path 214, and the common collection flow path 212.

Description of the Ejection Module

Figure 8A:
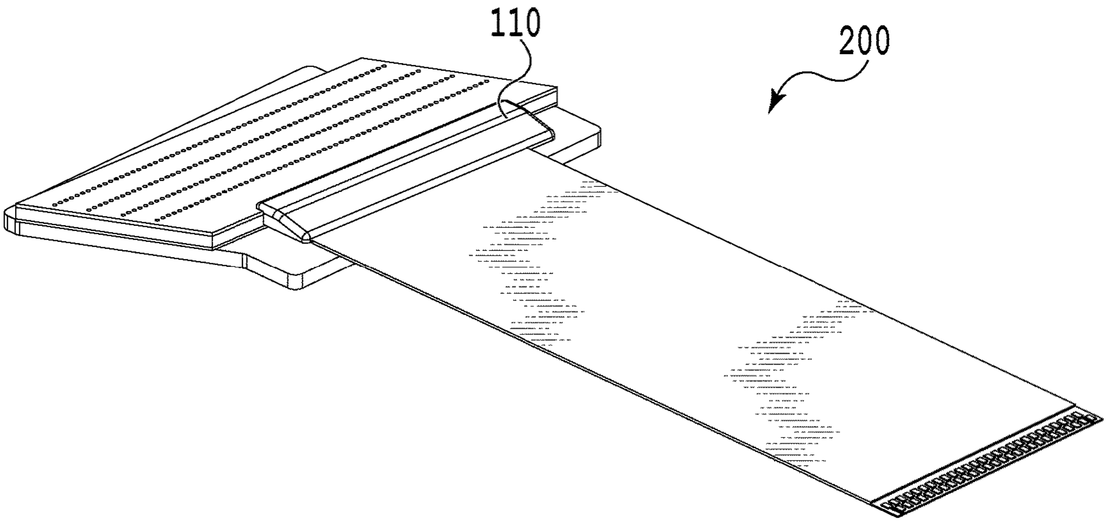
FIGS. 8A and 8B are perspective views of one of the ejection modules.
Figure 8B:
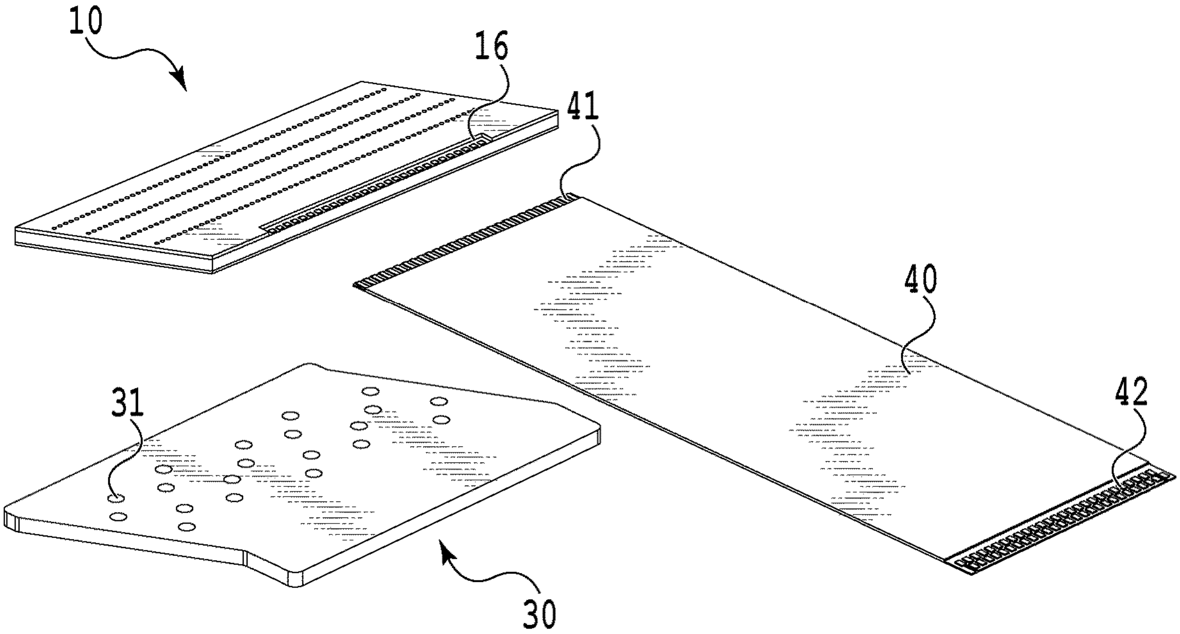

FIG. 8A shows a perspective view of one of the ejection modules 200, and FIG. 8B shows an exploded view thereof. As a method for manufacturing the ejection module 200, first, the print element substrate 10 and the flexible wiring substrate 40 are adhered onto the support member 30 in which a liquid communication port 31 is provided in advance. After that, a terminal 16 on the print element substrate 10 and a terminal 41 on the flexible wiring substrate 40 are electrically connected to each other by wire bonding, and a wire bonding unit (electric connection unit) is then covered with a sealing material to form a sealing unit 110.

A terminal 42 of the flexible wiring substrate 40 opposite to the print element substrate 10 is electrically connected to a connection terminal 93 (see FIG. 4) of the electric wiring substrate 90. The support member 30 is a support member that supports the print element substrate 10 and is also a flow path member that establishes fluid communication between the print element substrate 10 and the flow path member 210, and therefore preferably has a high flatness and can be bonded to the print element substrate with sufficiently high reliability. The material is preferably alumina or resin material, for example.

Description of the Print Element Substrate

Figure 9A:
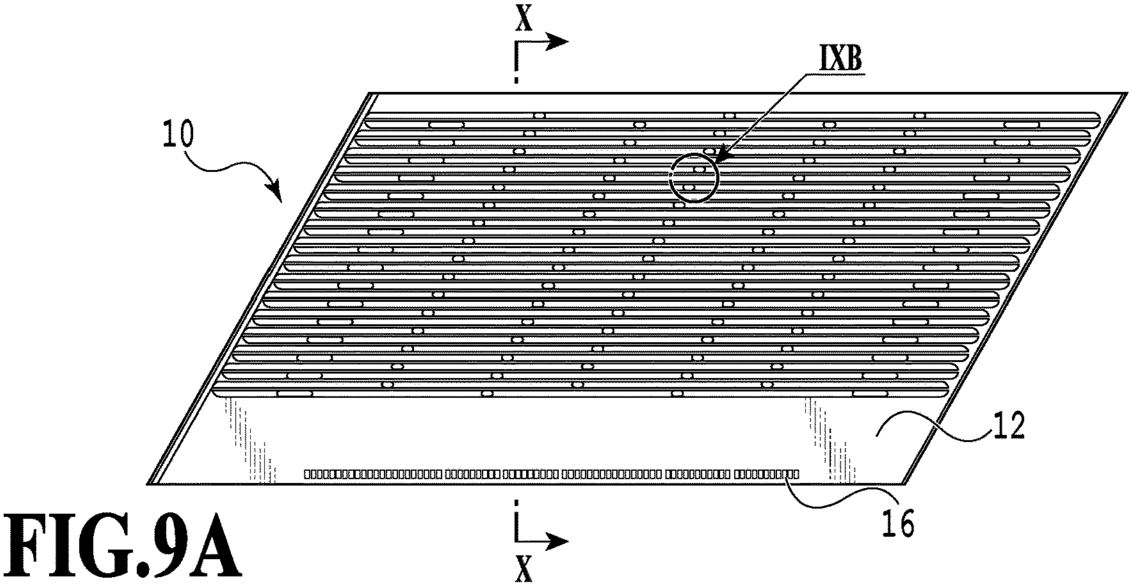
FIGS. 9A to 9C are plan views of a surface of a print element substrate on which an ejection port is formed.
Figure 9B:
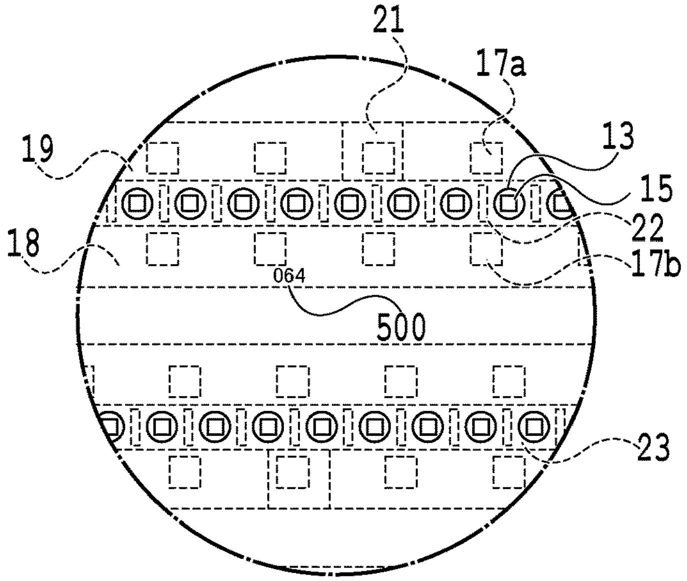
Figure 9C:
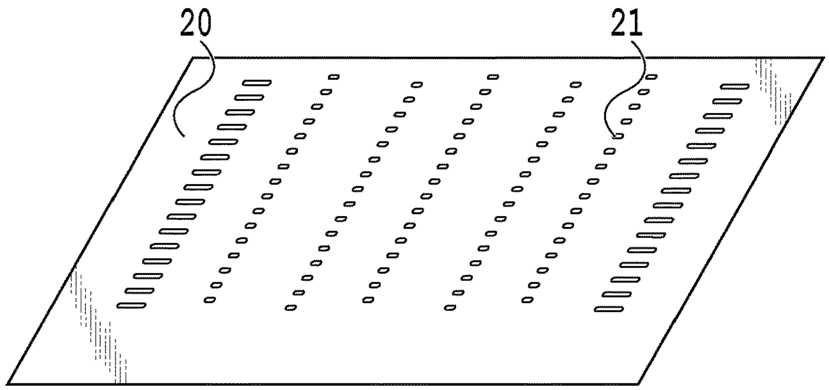

A configuration of the print element substrate 10 according to the present embodiment will be described. FIG. 9A shows a plan view of a] surface of the print element substrate 10 on which ejection ports 13 are formed, FIG. 9B shows an enlarged view of the portion indicated by IXB in FIG. 9A, and FIG. 9C shows a plan view of the back surface of FIG. 9A. As shown in FIG. 9A, four ejection port arrays corresponding to respective ink colors are formed in an ejection port forming member 12 of the print element substrate 10. It should be noted that hereinafter, a direction in which an ejection port array, in which the plurality of ejection ports 13 are arrayed, extends will be referred to as "ejection port array direction."

As shown in FIG. 9B, the print element 15, which is a heating element for bubbling liquid using thermal energy, is arranged in a position corresponding to the ejection port 13. A pressure chamber 23 including the print element 15 therein is defined by a partition 22. The print element 15 is electrically connected to the terminal 16 shown in FIG. 9A by electric wiring (not shown) provided in the print element substrate 10 to generate heat and boil liquid based on a pulse signal inputted from a control circuit in the printing apparatus 1000 through the electric wiring substrate 90 (FIG. 4) and the flexible wiring substrate 40 (FIG. 8B). The liquid is ejected from the ejection port 13 by the force of bubbling caused by the boiling. As shown in FIG. 9B, along the ejection port arrays, a liquid supply path 18 extends on one side, and a liquid collection path 19 extends on the other side. The liquid supply path 18 and the liquid collection path 19 are flow paths extending in the ejection port array direction and provided on the print element substrate 10 and communicate with the ejection port 13 via a supply port 17*a* and a collection port 17*b*, respectively.

Figure 10:
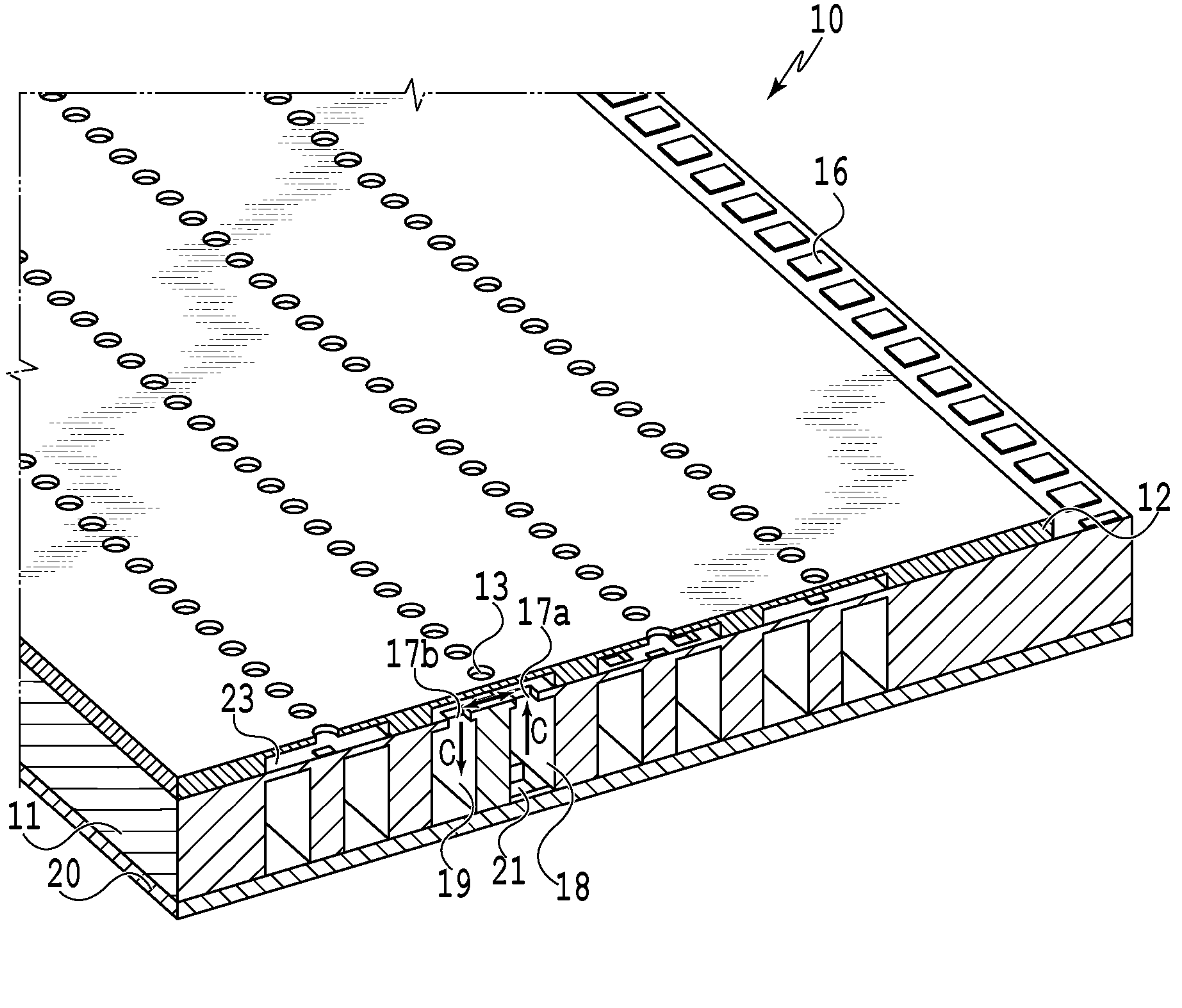
FIG. 10 is a cross-sectional perspective view of the print element substrate and a lid member taken along plane X-X in FIG. 9A.

FIG. 10 is a perspective view showing a cross section of the print element substrate 10 and a lid member 20 taken along plane X-X in FIG. 9A. As shown in FIGS. 9C and 10, the sheet-like lid member 20 is laminated on the back surface of the print element substrate 10 opposite to the surface thereof on which the ejection ports 13 are formed, and is provided with a plurality of openings 21 which communicate with the liquid supply path 18 and the liquid collection path 19 (to be described later). In the present embodiment, for example, the lid member 20 is provided with the three openings 21 for each liquid supply path 18 and with the two openings 21 for each liquid collection path 19. As shown in FIG. 9B, each opening 21 of the lid member 20 communicates with the plurality of communication ports 51 shown in FIG. 5A.

As shown in FIG. 10, the lid member 20 has a function as a lid that forms a portion of the walls of the liquid supply path 18 and liquid collection path 19 formed in a substrate 11 of the print element substrate 10. It is preferable that the lid member 20 be sufficiently corrosion resistant to liquid, and from the viewpoint of preventing color mixture, the shape and position of the opening 21 require high accuracy. Thus, it is preferable to use photosensitive resin material or a silicon plate as material for the lid member 20 and provide the opening 21 by a photolithography process. As described above, the lid member 20 converts the pitch of a flow path using the opening 21, and in consideration of pressure loss, it is desirable that the lid member 20 be thin and be formed of a film-like member.

Next, the flow of liquid in the print element substrate 10 will be described below. In the print element substrate 10, the substrate 11 formed of silicon and the ejection port forming member 12 formed of photosensitive resin are laminated, and the lid member 20 is bonded to the back surface of the substrate 11. The print element 15 (FIG. 9B) is formed on one surface of the substrate 11, and a groove forming the liquid supply path 18 and liquid collection path 19 extending along the ejection port arrays is formed on the back surface of the substrate 11. The liquid supply flow path 18 and liquid collection flow path 19 formed by the substrate 11 and the lid member 20 are connected to the common supply flow path 211 and common collection flow path 212 in the flow path member 210, respectively, and a differential pressure is generated between the liquid supply path 18 and the liquid collection path 19.

While liquid is ejected from the plurality of ejection ports 13 of the liquid ejection head 3 to perform printing, in the ejection port in which an ejection operation is not performed, liquid inside the liquid supply flow path 18 provided in the substrate 11 flows through the supply port 17*a*, the pressure chamber 23, and the collection port 17*b* into the liquid collection path 19 (the flow indicated by arrow C in FIG. 10) due to the differential pressure. This flow makes it possible to collect thickened ink generated by evaporation from the ejection port 13, an air bubble, foreign matter, and the like into the liquid collection path 19 in the ejection port 13 or pressure chamber 23 where printing is stopped.

It is also possible to suppress thickening of ink in the ejection port 13 and the pressure chamber 23. The liquid collected into the liquid collection path 19 is collected through the opening 21 of the lid member 20 and the liquid communication port 31 (FIG. 8B) of the support member 30 into the communication port 51, individual collection flow path 214, and common collection flow path 212 in the flow path member 210 in this order, and is finally collected into a supply path in the printing apparatus 1000. That is, liquid supplied from a printing apparatus body to the liquid ejection head 3 flows and is supplied and collected in the following order.

In the circulation path shown in FIG. 2, liquid first flows into the liquid ejection head 3 from the liquid connection unit 111 of the liquid supply unit 220, passes through the negative pressure control unit 230, and is then supplied to the joint rubber 100. The liquid is then supplied to the communication port 72 and common flow path groove 71 provided in the third flow path member, the common flow path groove 62 and communication port 61 provided in the second flow path member, and the individual flow path groove 52 and communication port 51 provided in the first flow path member in this order. Thereafter, the liquid is supplied to the pressure chamber 23 through the liquid communication port 31 provided in the support member 30, the opening 21 provided in the lid member 20, and the liquid supply path 18 and supply port 17*a* provided in the substrate 11 in this order.

Of the liquid supplied to the pressure chamber 23, liquid that has not been ejected from the ejection port 13 flows through the collection port 17*b* and liquid collection path 19 provided in the substrate 11, the opening 21 provided in the lid member 20, and the liquid communication port 31 provided in the support member 30 in this order. After that, the liquid flows through the communication port 51 and individual flow path groove 52 provided in the first flow path member, the communication port 61 and common flow path groove 62 provided in the second flow path member, the common flow path groove 71 and communication port 72 provided in the third flow path member 70, and the joint rubber 100 in this order, and flows from the liquid connection unit 111 provided in the liquid supply unit 220 to the outside of the liquid ejection head 3. In this way, the liquid ejection head according to the present embodiment can suppress thickening of liquid in the pressure chamber and the vicinity of the ejection port, thereby suppressing ejection slippages and non-ejection, and as a result, high-quality printing can be performed.

In the present embodiment, material for the ejection port forming member is photosensitive resin. However, the present disclosure is not limited to this. The configuration of the present disclosure can be preferably applied even to a case where, for example, silicon, metal, ceramic, glass, or any other material is used.

Description of the Positional Relationship Between Print Element Substrates

Figure 11:
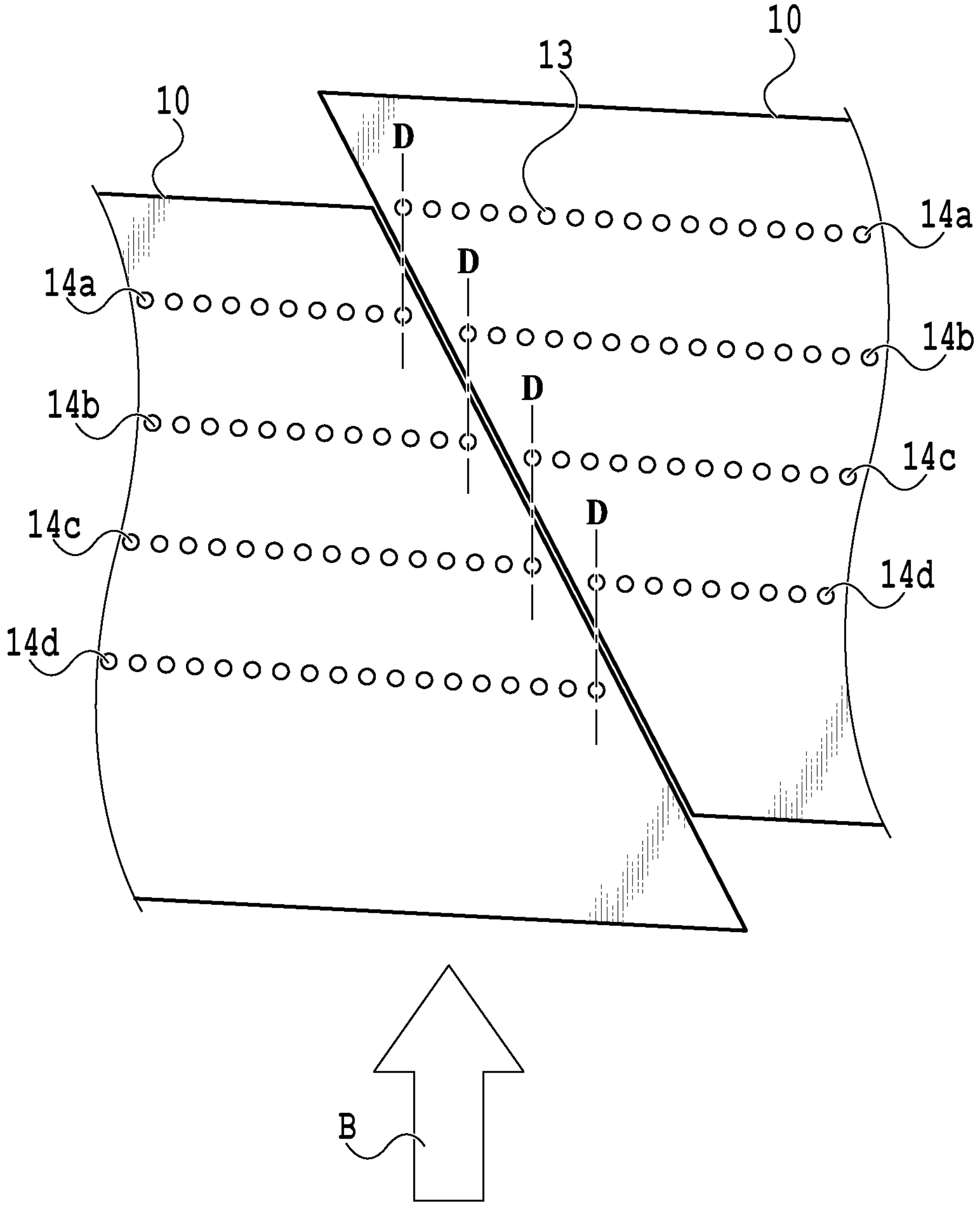
FIG. 11 is a partially enlarged plan view of the adjacent print element substrates.

FIG. 11 is a partially enlarged plan view of a portion where the print element substrates are adjacent to each other in the two adjacent ejection modules. As shown in FIG. 9A, the present embodiment uses a substantially parallelogram print element substrate. As shown in FIG. 11, each ejection port array (14*a* to 14*d*) in which the ejection ports 13 in each print element substrate 10 are arrayed is arranged so as to be inclined at a constant angle with respect to a conveyance direction B in which a print medium is conveyed. As a result, in an ejection array in the portion where the print element substrates 10 are adjacent to each other, at least one ejection port is overlapped in the conveyance direction of the print medium. In FIG. 11, two ejection ports on a line D overlap each other. With such an arrangement, even in a case where the position of the print element substrate 10 deviates from a predetermined position to a certain degree, black streaks and blank areas in a printed image can be made less noticeable by controlling the drive of the overlapping ejection ports. In a case where the plurality of print element substrates 10 are arranged on a straight line (in-line) instead of in a staggered pattern, the configuration as shown in FIG. 11 also makes it possible to take measures against black streaks and blank areas at a joint between the print element substrates 10 while suppressing an increase in the length of the liquid ejection head 3 in the conveyance direction of the print medium. It should be noted that in the present embodiment, the main face of the print element substrate 10 is a parallelogram. However, the present disclosure is not limited to this, and the configuration of the present disclosure can be preferably applied even to the case of using a print element substrate having, for example, a rectangular, trapezoidal, or any other shape.

Regarding a Print Element Number

A print element number 500 is printed or engraved near the ejection port 13 of the print element substrate 10 shown in FIG. 9B, and a protective member 140 (to be described later) is overlaid on the print element substrate 10.

The protective member 140 is provided to suppress damage to the ejection port 13 due to contact of a print medium with the ejection port 13. Thus, the protective member 140 does not cover the ejection port 13 but is provided in a position near the ejection port 13.

On the other hand, for example, in the event of a failure in the inkjet printing apparatus 1000, the print element number 500 makes it easier to specify which ejection port 13 has trouble by specifying a number inscribed near the ejection port 13 having the trouble. This print element number 500 is provided near the ejection port 13 and, as a result, is provided near an end of the protective member 140. Thus, in a case where the protective member 140 covers the print element number 500 or where an adhesive at the end of the protective member 140 creeps up onto the protective member 140, the print element number 500 may become invisible due to a change in refractive index caused by the adhesive. Thus, this problem will be solved by an embodiment to be described below.

DESCRIPTION OF EMBODIMENTS OF THE PRESENT DISCLOSURE

First Embodiment

A first embodiment of the present disclosure will be described. Descriptions will be omitted of functions similar to those of the basic configuration of the present disclosure and configurations similar to the basic configuration of the present disclosure, and differences will be described.

Figure 12A:
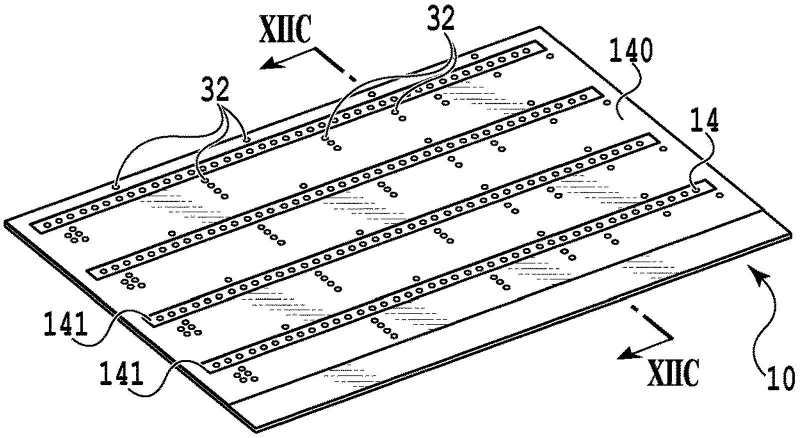
FIGS. 12A to 12C are simplified perspective views of the ejection module according to a first embodiment.
Figure 12B:
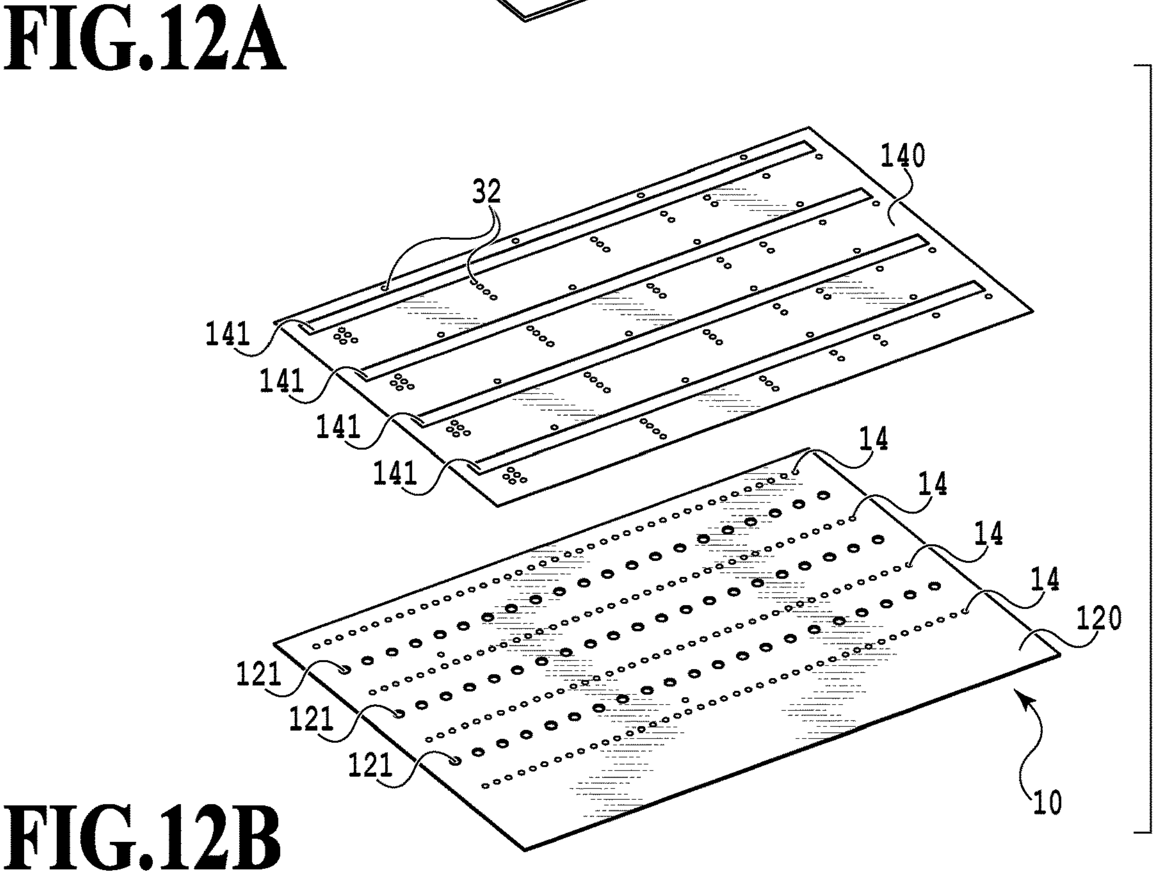
Figure 12C:
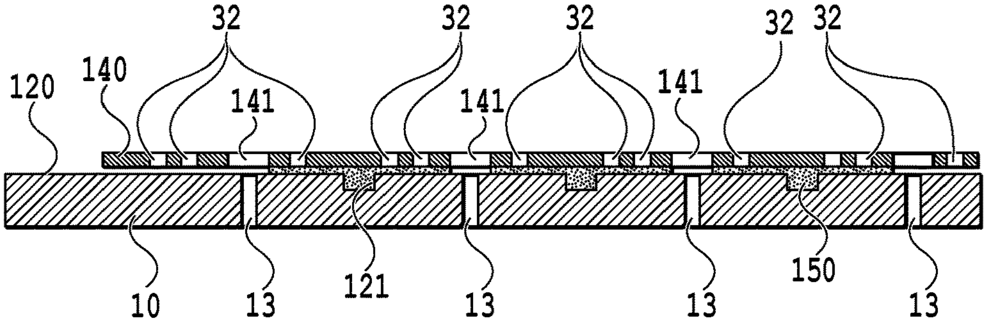
Figure 13A:
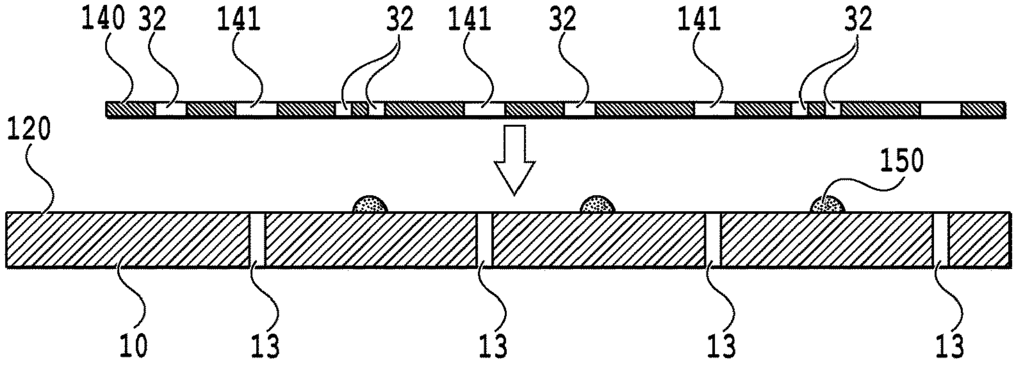
FIGS. 13A to 13C are schematic diagrams showing an adhesive application state.
Figure 13B:
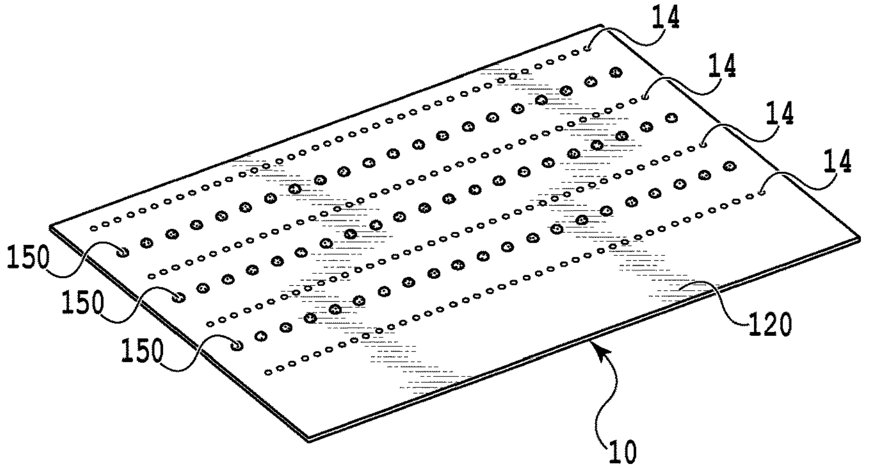
Figure 13C:
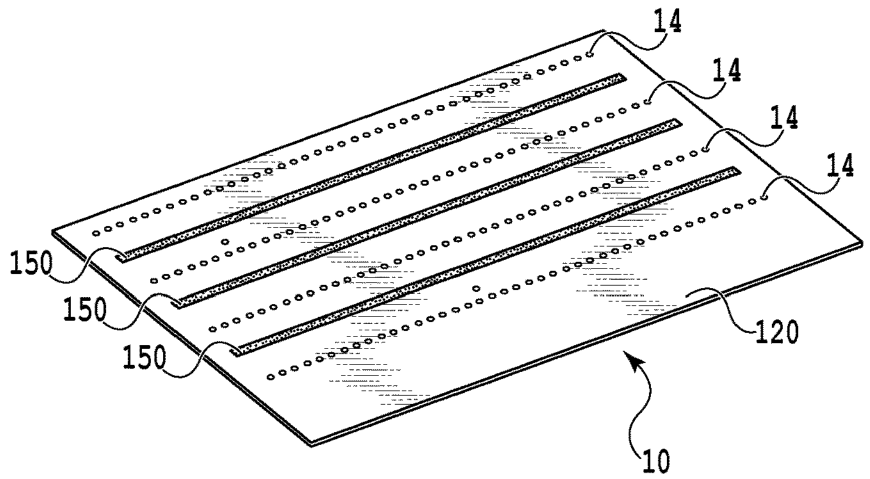
Figure 14A:
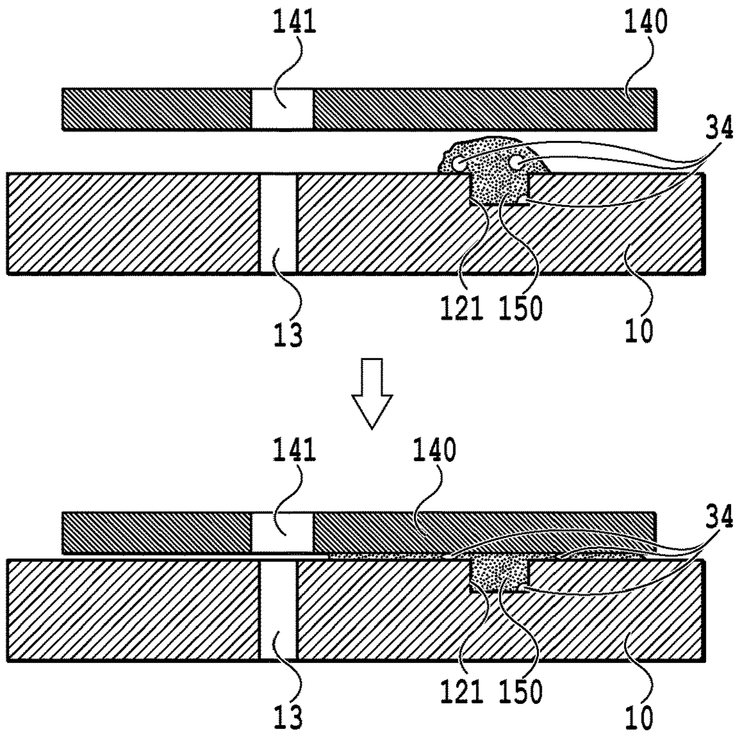
FIGS. 14A and 14B are schematic diagrams showing examples of the cases of adhering a conventional protective member and a protective member according to the present disclosure.
Figure 14B:
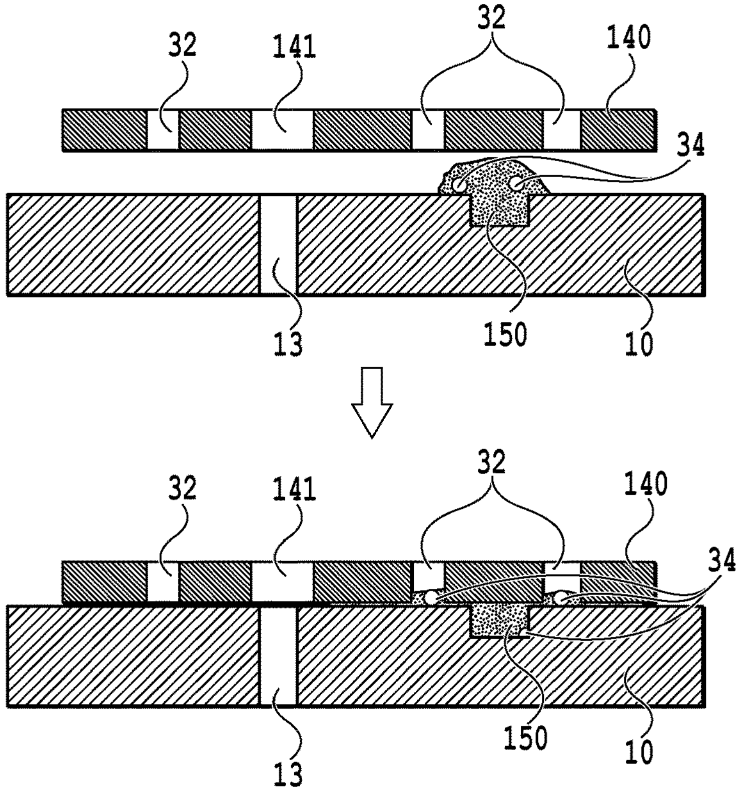

FIG. 12A is a simplified perspective view of an ejection module according to the first embodiment. FIG. 12B is an exploded perspective view of FIG. 12A. FIG. 12C is a cross-sectional view taken along line XIIC-XIIC in FIG. 12A. FIG. 13A is a schematic diagram showing an adhesive application state in FIG. 12C. FIGS. 13B and 13C are schematic diagrams showing an example of an adhesive application position in FIG. 13A. FIG. 14A is a schematic diagram showing an example in which a through hole 32 is not open unlike the present disclosure. FIG. 14B is a schematic diagram showing an example of the adhesive application state in FIG. 12C. It should be noted that a portion of the configurations in FIGS. 12A to 12C, FIGS. 13A to 13C, and FIGS. 14A and 14B is simplified to facilitate understanding.

In the first embodiment, unlike the above-described basic configuration, the protective member 140 laminated on an ejection surface 120 has one or more through holes 32, which are print element number identifiers for identifying a print element number. It should be noted that the print element number identifiers include an ejection port identifier that identifies each ejection port corresponding to a print element. Specifically, as shown in FIGS. 12A to 12C, an opening 141 is formed for each ejection port array 14 in the protective member 140, and the ejection surface 120 and the protective member 140 are adhered to each other with an adhesive 150 to form a contact layer on the ejection surface 120 side of the protective member 140. Further, the one or more through holes 32 are provided at a plurality of locations between the ejection port arrays 14 or between the transverse end of the protective member 140 and the ejection port array 14.

Adhering the ejection port arrays 14 so that the protective member 140 is not isolated from the ejection surface 120 near the ejection port array 14 makes it possible for a cleaning mechanism (not shown) to more suitably collect liquid in the liquid ejection head 3. Thus, as shown in FIGS. 13A to 13C as an example, the adhesive 150 is applied to the ejection surface 120 between the adjacent ejection port arrays 14, and the ejection surface 120 and the protective member 140 are adhered to each other with the adhesive 150.

At this time, as shown in FIG. 13B, the use amount of the adhesive 150 can be reduced by intermittently applying the adhesive 150 between the adjacent ejection port arrays 14. It is also possible to make the adhesive 150 difficult to overflow into the ejection port 13 side at the time of applying or thermally curing the adhesive, and make the adhesive 150 difficult to flow into the ejection port 13.

On the other hand, in the case of reducing the amount of application, there is a possibility that the strength of adhesion to the print element substrate 10 will be reduced depending on the type of protective member 140 or the like.

Thus, as shown in FIG. 13C, continuously applying the adhesive 150 between the adjacent ejection port arrays 14 makes it possible to increase the strength of adhesion as compared to the case of applying the adhesive 150 intermittently. However, at this time, there is a possibility that the amount of application will be large, or that variations in the amount of application will be produced depending on the location. The adhesive 150 then may overflow through the opening 141 of the protective member 140 to the vicinity of the ejection port 13. However, since the protective member 140 itself has the through hole 32 in the configuration of the present disclosure, it is possible to suppress the adhesive 150 rising upward through the through hole 32 and overflowing through the opening 141 of the protective member 140 to the vicinity of the ejection port 13.

Further, as shown in FIG. 14A, the adhesive 150 laid on the print element substrate 10 may contain an air bubble 34. In this case, in a case where the protective member 140 with no through hole 32 presses down, the air bubble 34 remains between the print element substrate 10 and the protective member 140 and loses a place to escape. In this state, there is a probability that the protective member 140 may peel off due to the expansion or movement of the air bubble 34 due to heat generated by implementation during head production or temperature adjustment processing during printing. However, as shown in FIG. 14B, the through hole 32 with an opening is located between the ejection port arrays 14, so that in a case where the protective member 140 is pressed against the print element substrate 10, the air bubble 34 escapes from the opening portion of the through hole 32. This can suppress the protective member 140 peeling off during implementation or during periods of use.

Figure 15A:
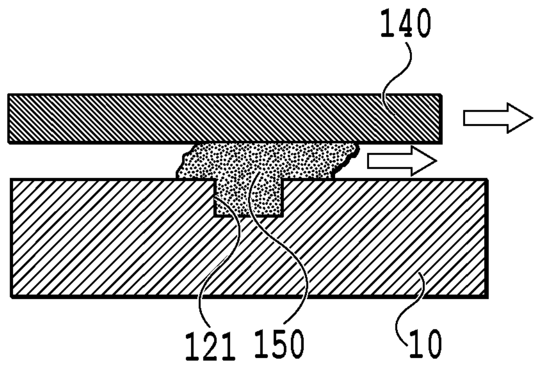
FIGS. 15A and 15B are schematic diagrams showing an example of adhesion of a protective member configured differently from that in the present disclosure and an example of adhesion of the protective member according to the present disclosure.
Figure 15B:
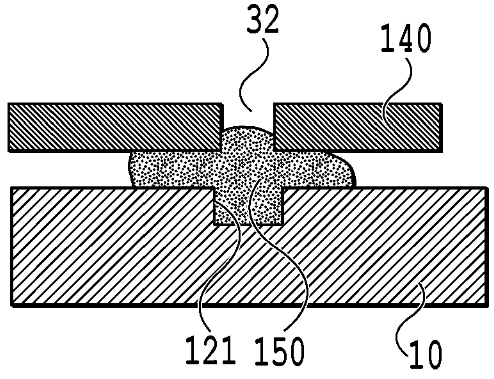

Since the protective member 140 is attached only by placing the protective member 140 on the adhesive 150, in the case of using the protective member 140 with no through hole 32 as shown in FIG. 15A, there is a probability of misalignment after placement. However, in a case where the through hole 32 is provided as shown in FIG. 15B, the protective member 140 can be attached to a more stable position by aligning a recess 121 of the print element substrate 10 with the through hole 32. As described above, in a case where the protective member 140 itself has the through hole 32, misalignment between the print element substrate 10 and the protective member 140 can be suppressed.

It is only required that the through hole 32 have an opening in a visually recognizable shape. As shown in FIG. 12A, it is possible, based on the through hole 32, to determine that the shape is a visually recognizable predetermined shape and determine a number corresponding to the print element number 500 based on the predetermined number of through holes 32. It is also possible to sufficiently allow an air bubble to escape by keeping the area of openings substantially constant regardless of the location by increasing the size or number of the through holes 32 with a smaller print element number in consideration of the balance of the opening area of the through holes 32. Even in a case where misalignment occurs in the nozzle array direction, the protective member 140 having the through hole 32 corresponding to a print element number for the print element located at an end makes it is possible to instantly determine in which direction the misalignment occurs and make a correction at the time of checking the print element number.

With such a configuration as described above, in the liquid ejection head 3, the protective member 140 can suppress contact between the print medium 2 and the print element substrate 10 in a case where the print medium 2 floats during conveyance. Further, design is performed so that misalignment between the protective member 140 and the print element substrate 10 can be appropriately prevented, and it is possible to visually recognize a print element number identifier corresponding to a print element number and secure reliability during an implementation process or during periods of use.

Here, material for the protective member 140 preferably has a higher elastic modulus than that of material for the ejection port forming member 12, but the present disclosure is not specifically limited to this. For example, metal material such as stainless steel or aluminum, silicon, alumina, resin, or the like may be used. In addition, using material having substantially the same coefficient of linear expansion as that of material for the print element substrate 10 or a member forming the ejection ports can reduce the risk of the protective member 140 peeling off from the ejection port forming member 12.

Further, it is preferable that the outer shape of the protective member 140 and the opening 141 be processed with high accuracy. Examples of a processing method include, for example, etching, laser processing, and machining, and in the case of photosensitive resin, exposure or the like is used.

At this time, depending on the processing method, burrs or fins may occur on the outer shape of the protective member 140 and the edge portion of the opening 141. Thus, causing the burrs or fins on a surface adhered to the ejection surface 120 can reduce the risk of damage to the cleaning mechanism (not shown). In the case of using resin such as photosensitive resin, even in a case where there are burrs, affixation can be performed without considering which surface has the burrs. It should be noted that giving a predetermined shape to the through hole 32 as shown in FIG. 12A makes it possible to identify the print element number 500 based on the number of through holes 32. Further, arranging the through hole 32 at the center of the applied adhesive in consideration of the positional relationship with the adhesive allows the air bubble 34 to easily escape.

Second Embodiment

A second embodiment of the present disclosure will be described. Descriptions will be omitted of functions similar to those of the basic configuration of the present disclosure, configurations similar to the basic configuration of the present disclosure, and functions and configurations similar to those in the first embodiment, and differences will be described.

Figure 16:
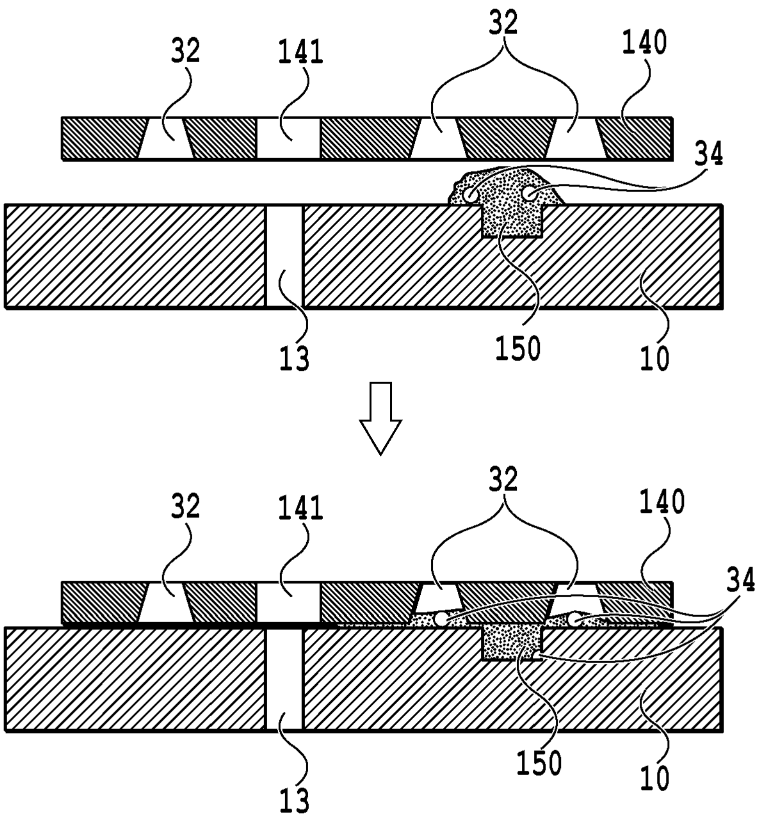
FIG. 16 is a schematic diagram showing an example of adhesion of the protective member with a tapered portion according to the present disclosure.

As shown in FIG. 16, widening the opening on the print element substrate 10 side of the through hole 32 and giving a tapered shape to the inside allow more air bubbles 34 to be collected. On the other hand, placing mutually contacting portions of the protective member 140 and the print element substrate 10 at the center of the adhesive can achieve sufficient adhesion even in a case where the area of contact between the protective member 140 and the print element substrate 10 is reduced.

Third Embodiment

A third embodiment of the present disclosure will be described. Descriptions will be omitted of functions similar to those of the basic configuration of the present disclosure, configurations similar to the basic configuration of the present disclosure, and functions and configurations similar to those in the first and second embodiments, and differences will be described.

The through holes 32 each may have a different shape, and a print element number identifier corresponding to a print element number can be identified based on the size of the opening of the through hole 32. However, there is no limit to the size or shape of the opening of the through hole 32 as long as contents corresponding to a print element number can be identified. Further, the through holes 32 preferably have openings as evenly as possible in the longitudinal direction of the ejection port arrays in consideration of the balance of the openings of the through holes 32.

Fourth Embodiment

As described above, the through hole 32 having one or more openings has been described in the first to third embodiments. However, in the present disclosure, since it is only required that the print element number 500 be identified, even in a case where there is no opening, it is only required that there be a visually identifiable description on the protective member in the form of a marking, depression, or the like, and the present disclosure is not specifically limited to this.

Fifth Embodiment

A fifth embodiment of the present disclosure will be described. Descriptions will be omitted of functions similar to those of the basic configuration of the present disclosure, configurations similar to the basic configuration of the present disclosure, and functions and configurations similar to those in the first to fourth embodiments, and differences will be described.

Figure 17:
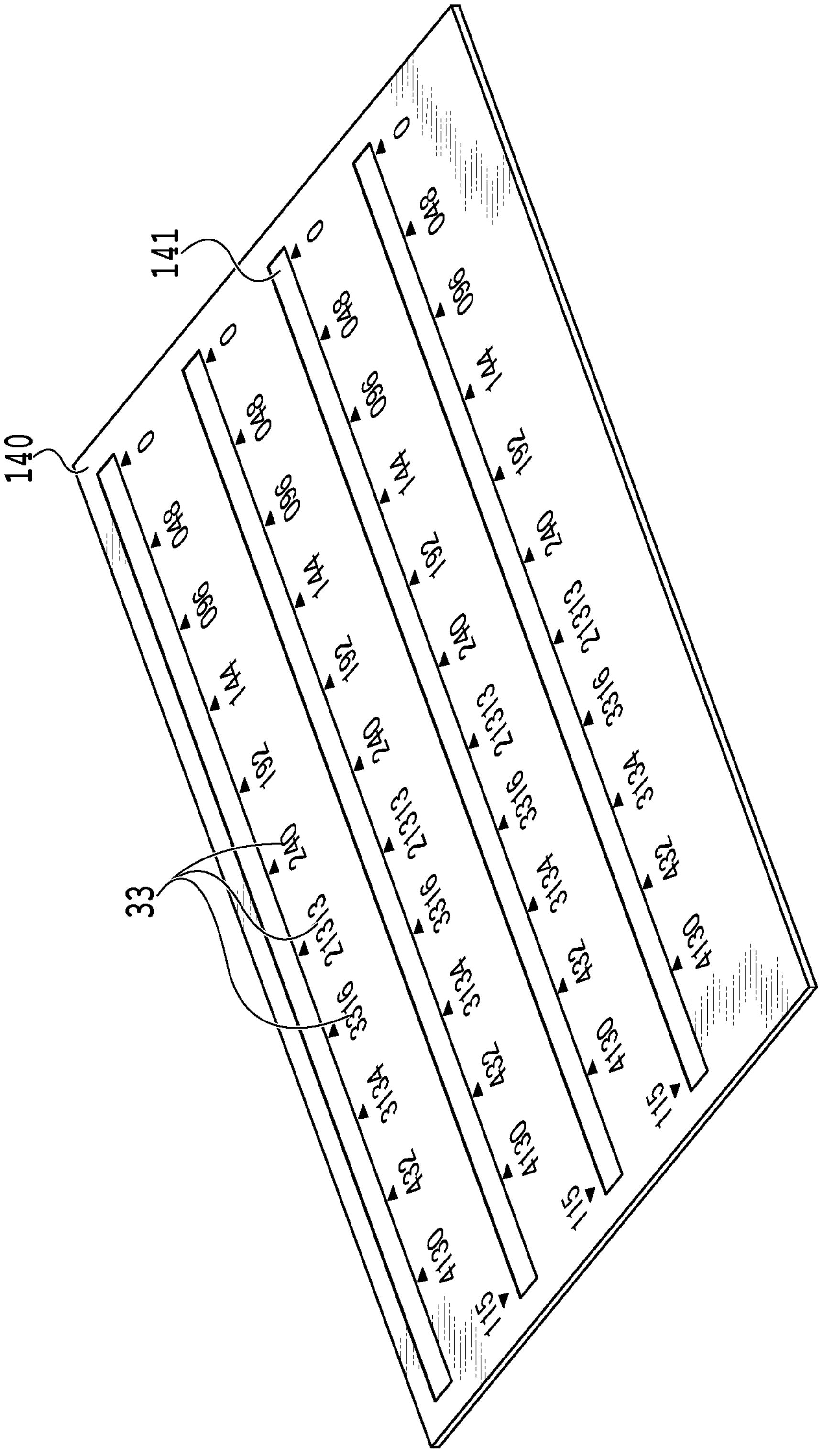
FIG. 17 is a simplified perspective view of the protective member according to a fifth embodiment.

FIG. 17 is a perspective view of the fifth embodiment and shows numbers 33 obtained by replacing the plurality of through holes 32 in FIG. 12A with numerals.

Even in a case where the accuracy of alignment can be increased as described in the first embodiment, in a case where the protective member 140 is misaligned in a direction orthogonal to the ejection port array 14 or where the adhesive creeps up from an opening between the arrays, the print element number 500 formed on the print element substrate 10 may become invisible. Thus, the numbers 33, which are print element number identifiers corresponding to the print element numbers 500, are formed on the protective member 140. This makes it easy to balance the area of the openings 141 and visually determine the numbers 33. Further, even in a case where misalignment occurs in the longitudinal direction of the ejection port arrays, forming the numbers 33 corresponding to the print element numbers 500 at the ends of the ejection port arrays makes it possible to determine the degree of misalignment and enables easy number correction.

Incidentally, regarding numerals, it is only required that the numbers 33 be visually identified, and the numerals are not limited to those in the present mode. Further, in the case of a numeral such as 6, a round portion of the numeral may be completely open.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, it is possible to provide a liquid ejection head in which a print element number can be reliably checked and reliability can be maintained even using a protective member added to reduce the risk of damage to a liquid ejection head due to contact with a print medium.

This application claims the benefit of Japanese Patent Application No. 2022-211411, filed Dec. 28, 2022, which is hereby incorporated by reference herein in its entirety.

What is claimed is:

1. A liquid ejection head comprising:

a print element substrate having an ejection surface on which a plurality of ejection ports corresponding to print elements for ejecting liquid are formed and a plurality of ejection port arrays each formed of a portion of the plurality of the ejection ports are formed; and a protective member having a plurality of openings and placed on the print element substrate so that the plurality of openings and the plurality of ejection port arrays are aligned so as to correspond to each other, wherein one or more print element number identifiers for identifying one or more print element numbers assigned to the print elements are at one or more locations above the ejection port arrays and near at least one of the plurality of openings on the protective member, and the one or more print element number identifiers on the protective member are located at the one or more locations between the ejection port arrays or between a transverse end of the protective member and one of ejection port arrays.

2. The liquid ejection head according to claim 1, wherein a number of the one or more print element number identifiers varies according to the print element number.

3. The liquid ejection head according to claim 1, wherein the openings having an identical area regardless of the print element numbers assigned to the corresponding print elements.

4. The liquid ejection head according to claim 1, wherein each of the one or more print element number identifiers display a numeral corresponding to the print element number.

5. The liquid ejection head according to claim 1, wherein the one or more print element number identifiers have a tapered shape in a direction in which the one or more print element number identifiers penetrate, the tapered shape having a width increasing from an exterior surface toward the print element substrate.

6. The liquid ejection head according to claim 1, wherein or more than one print element number identifiers are provided and display a maximum value and a minimum value of the print element number.

7. The liquid ejection head according to claim 1, wherein the print element substrate and the protective member are adhered to each other with an adhesive.

8. The liquid ejection head according to claim 1, wherein the protective member is made of metal.

9. The liquid ejection head according to claim 8, wherein the metal is stainless steel.

10. The liquid ejection head according to claim 1, wherein the protective member is made of resin.

11. The liquid ejection head according to claim 1, wherein a contact layer is formed at least on an ejection surface side of the protective member.

12. The liquid ejection head according to claim 1, wherein a plurality of the print element substrates are arrayed in a flow path member so that at least portions of the print element substrates overlap each other.

13. The liquid ejection head according to claim 1, wherein the liquid ejection head is a line head compatible with a width of a print medium.

14. A liquid ejection head, comprising:

a print element substrate having an ejection surface on which a plurality of ejection ports corresponding to print elements for ejecting liquid are formed and a plurality of ejection port arrays each formed of a portion of the plurality of the ejection ports are formed; and a protective member having a plurality of openings and placed on the print element substrate so that the plurality of openings and the plurality of ejection port arrays are aligned so as to correspond to each other, wherein one or more print element number identifiers for identifying one or more print element numbers assigned to the print elements are at one or more locations above the ejection port arrays and near at least one of the plurality of openings on the protective member, and the one or more print element number identifiers are through-holes penetrating a lower layer surface from an upper layer surface of the protective member.

15. A liquid ejection apparatus comprising:

a print element substrate having an ejection surface on which a plurality of ejection port arrays for ejecting liquid are formed; and a protective member having a plurality of openings and placed on the print element substrate so that the plurality of openings and the plurality of ejection port arrays are aligned so as to correspond to each other, wherein one or more print element number identifiers for identifying one or more print element numbers are at one or more locations above the ejection port arrays and near at least one of the plurality of openings on the protective member, and the one or more print element number identifiers on the protective member are located at the one or more locations between the ejection port arrays or between a transverse end of the protective member and one of ejection port arrays.

* * * * *